(12) United States Patent
Aixinjueluo et al.

(10) Patent No.: US 11,516,303 B2
(45) Date of Patent: Nov. 29, 2022

(54) METHOD FOR DISPLAYING MEDIA RESOURCES AND TERMINAL

(71) Applicant: BEIJING DAJIA INTERNET INFORMATION TECHNOLOGY CO., LTD., Beijing (CN)

(72) Inventors: Qishen Aixinjueluo, Beijing (CN); Wenxin He, Beijing (CN); Bo Peng, Beijing (CN); Dan Yu, Beijing (CN); Peng Wang, Beijing (CN); Jun Wu, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 17/393,596

(22) Filed: Aug. 4, 2021

(65) Prior Publication Data

US 2022/0103645 A1 Mar. 31, 2022

(30) Foreign Application Priority Data

Sep. 28, 2020 (CN) .......................... 202011046118.X

(51) Int. Cl.
*H04W 4/00* (2018.01)
*H04L 67/52* (2022.01)
*G06F 3/0482* (2013.01)
*G06F 3/04842* (2022.01)
*H04L 67/02* (2022.01)
(Continued)

(52) U.S. Cl.
CPC ............ *H04L 67/52* (2022.05); *G06F 3/0482* (2013.01); *G06F 3/04842* (2013.01); *H04L 67/02* (2013.01); *H04L 67/306* (2013.01); *H04L 67/535* (2022.05)

(58) Field of Classification Search
CPC ............... G06F 3/0482; G06F 3/04842; G06F 16/7335; G06F 16/738; H04W 4/02
See application file for complete search history.

(56) References Cited

U.S. PATENT DOCUMENTS 8,245,155 B2 * 8/2012 Nakajima ........... G06F 3/04886
715/833
2009/0010491 A1 * 1/2009 Ko ........................ G06F 3/0481
382/103
(Continued)

FOREIGN PATENT DOCUMENTS

CN            106407710 A        2/2017

OTHER PUBLICATIONS

The Hague, Extended European Search Report Communication Pursuant to Rule 62 EPC, dated Dec. 3, 2021 in Patent Application No. EP 21189919.0, which is a foreign counterpart to this application.

(Continued)

*Primary Examiner* — Omoniyi Obayanju
(74) *Attorney, Agent, or Firm* — Kolitch Romano Dascenzo Gates LLC

(57) ABSTRACT

The method for displaying media resources comprises displaying an activity page; acquiring a first media resource corresponding to a first region in response to detecting a target event based on the activity page; and displaying the first media resource in the activity page. The activity page is configured to trigger a display of a media resource corresponding to a region, and the first media resource is configured to recommend the first region.

19 Claims, 25 Drawing Sheets

(51) Int. Cl.
  *H04L 67/306* (2022.01)
  *H04L 67/50* (2022.01)

(56) References Cited

U.S. PATENT DOCUMENTS

| | | | |
|---|---|---|---|
| 2009/0253463 | A1 | 10/2009 | Shin et al. |
| 2010/0119121 | A1* | 5/2010 | Lim .................. G06K 9/00704 382/113 |
| 2010/0325646 | A1* | 12/2010 | Alhadeff ................ G06Q 30/02 725/10 |
| 2011/0173565 | A1* | 7/2011 | Ofek ...................... G09B 29/00 715/790 |
| 2013/0187850 | A1 | 7/2013 | Schulz et al. |
| 2015/0185991 | A1* | 7/2015 | Ho ........................ G01C 21/00 715/771 |
| 2015/0350402 | A1 | 12/2015 | Tsuji |
| 2016/0259420 | A1* | 9/2016 | Kim ........................ G06F 3/017 |
| 2018/0032997 | A1 | 2/2018 | Gordon et al. |
| 2020/0302480 | A1 | 9/2020 | Busch |

OTHER PUBLICATIONS

Communication pursuant to Article 94(3) EPC of counterpart EP application No. 21189919.0 dated Dec. 15, 2021.
Communication pursuant to Article 94(3) EPC of European application No. 21189919.0 dated Jul. 28, 2022.

* cited by examiner

METHOD FOR DISPLAYING MEDIA RESOURCES AND TERMINAL

CROSS-REFERENCE TO RELATED APPLICATION

This application is based on and claims priority to Chinese Patent Application No. 202011046118.X, filed on Sep. 28, 2020, the disclosure of which is herein incorporated by reference in its entirety.

TECHNICAL FIELD

The present disclosure relates to the field of Internet technologies, and particularly relates to a method for displaying media resources and a terminal.

BACKGROUND

With rapid development of mobile Internet technologies and computer technologies, except for basic multimedia playback services, current multimedia applications may further provide services of displaying media resources based on city information, such as an intra-city video, an intra-city picture and an intra-city text. Due to strong geographic attributes of the intra-city, more users can be attracted to use multimedia applications by displaying intra-city media resources.

SUMMARY

The present disclosure provides a method for displaying media resources and a terminal, which can improve the human-computer interaction efficiency. Technical solutions of the present disclosure are as follows:

According to an aspect of embodiments of the present disclosure, a method for displaying media resources applicable to a terminal is provided. The method for displaying media resources includes: displaying an activity page, wherein the activity page is configured to trigger a display of a media resource corresponding to a region; acquiring a first media resource corresponding to a first region in response to detecting a target event based on the activity page, wherein the first media resource is configured to recommend the first region; and displaying the first media resource in the activity page.

According to another aspect of embodiments of the present disclosure, a method for displaying media resources applicable to a server is provided. The method for displaying media resources includes: receiving a request for media resource acquisition transmitted by a terminal based on an activity page, wherein the activity page is configured to trigger a display of a media resource corresponding to a region; selecting a first media resource corresponding to a first region from multiple media resources; and returning resource information of the first media resource and the first region to the terminal.

According to another aspect of embodiments of the present disclosure, a terminal is provided. The terminal includes:
one or more processors; and
a memory configured to store program code executable by the processor, wherein
the processor, when executing the program code, is caused to perform: displaying an activity page, wherein the activity page is configured to trigger a display of a media resource corresponding to a region; acquiring a first media resource corresponding to a first region in response to detecting a target event based on the activity page, wherein the first media resource is configured to recommend the first region; and displaying the first media resource in the activity page.

According to another aspect of embodiments of the present disclosure, a server is provided. The server includes:
one or more processors; and
a memory configured to store program code executable by the processor, wherein
the processor, when executing the program code, is caused to perform: receiving a request for media resource acquisition transmitted by a terminal based on an activity page, wherein the activity page is configured to trigger a display of a media resource corresponding to a region; selecting a first media resource corresponding to a first region from multiple media resources; and returning resource information of the first media resource and the first region to the terminal.

According to another aspect of embodiments of the present disclosure, a storage medium storing program code is provided. Wherein the program code, when executed by a processor of a terminal, causes the terminal to perform: displaying an activity page, wherein the activity page is configured to trigger a display of a media resource corresponding to a region; acquiring a first media resource corresponding to a first region in response to detecting a target event based on the activity page, wherein the first media resource is configured to recommend the first region; and displaying the first media resource in the activity page.

According to another aspect of embodiments of the present disclosure, a storage medium storing program code is provided. Wherein the program code, when executed by a processor of a server, causes the sever to perform: receiving a request for media resource acquisition transmitted by a terminal based on a activity page, wherein the activity page is configured to trigger a display of a media resource corresponding to a region; selecting a first media resource corresponding to a first region from multiple media resources; and returning resource information of the first media resource and the first region to the terminal.

According to another aspect of embodiments of the present disclosure, a computer program product is provided. The computer program product includes computer program code stored in a non-transitory computer-readable storage medium. A processor of a terminal reads the computer program code from the non-transitory computer-readable storage medium, and the computer program code, when executed by the processor, causes the terminal to perform: displaying an activity page, wherein the activity page is configured to trigger a display of a media resource corresponding to a region; acquiring a first media resource corresponding to a first region in response to detecting a target event based on the activity page, wherein the first media resource is configured to recommend the first region; and displaying the first media resource in the activity page.

According to another aspect of embodiments of the present disclosure, a computer program product is provided. The computer program product includes computer program code stored in a non-transitory computer-readable storage medium. A processor of a sever reads the computer program code from the non-transitory computer-readable storage medium, and the computer program code, when executed by the processor, causes the sever to perform: receiving a request for media resource acquisition transmitted by a terminal based on a activity page, wherein the activity page is configured to trigger a display of a media resource corresponding to a region; selecting a first media resource corresponding to a first region from multiple media resources; and returning resource information of the first media resource and the first region to the terminal.

DETAILED DESCRIPTION

Figure 1:
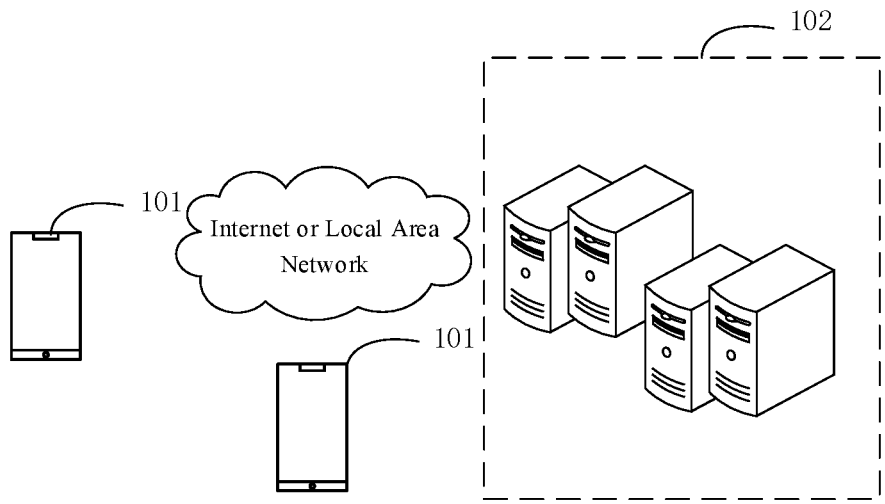
FIG. 1 is a schematic diagram of an implementation environment of a method for displaying media resources according to an exemplary embodiment.

FIG. 1 is a schematic diagram of an implementation environment of a method for displaying media resources according to an exemplary embodiment. Referring to FIG. 1, the implementation environment includes: a terminal 101 and the server 102.

In some embodiments, the terminal 101 is at least one of devices such as a smart phone, a smart watch, a desktop computer, a laptop computer, a virtual reality terminal, an augmented reality terminal, a wireless terminal, and a laptop portable computer. The terminal 101 has a communication function and may be accessed to the Internet. In some embodiments, the terminal 101 generally refers to one of the multiple terminals, and the present embodiment is only illustrated by terminal 101. Those skilled in the art may know that the number of the aforementioned terminals may be more or less. The terminal 101 may run an application with a video push function, such as a video application, a live broadcast application, and a social application. Subsequently, a term "target application" is used to represent the application with the video push function.

In some embodiments, the server 102 is an independent physical server, or a server cluster or a distributed file system composed of multiple physical servers, or a cloud server which provides basic cloud computing services such as cloud services, cloud databases, cloud computing, cloud functions, cloud storage, network services, cloud communication, middleware services, domain name services, security services, content delivery networks (CDN), big data and artificial intelligence platforms. In some embodiments, the server 102 is a platform server of an application with the video push function. The server 102 is directly or indirectly connected to the terminal 101 through wired or wireless communications, which is not limited in the embodiment of the present disclosure. Optionally, the number of the aforementioned servers 102 may be more or less, which is not limited in the embodiment of the present disclosure. Of course, the server 102 may also include other functional servers to provide more comprehensive and diversified services.

A process of implementing the present disclosure is performed by the terminal 101 and the server 102 together as follows: a user operates the terminal 101 to activate the target application and log in a user account in the target application. When the user wants to participate in a target activity (that is, the user wants to view a media resource corresponding to a region), he/she opens an activity page and performs a trigger operation on the activity page. The user's trigger operation is detected by the terminal 101. Acquiring media resources to be displayed includes following steps: transmitting, by the terminal 101, a request for media resource acquisition to the server 102, randomly selecting, by the server 102, a media resource corresponding to a region after receiving the request for media resource acquisition and returning resource information of the media resource and the region corresponding to the media resource to the terminal 101 based on the media resource of the selected region, and displaying, by the terminal 101, the media resource corresponding to the selected region based on the received resource information of the media resource and the region corresponding to the media resource.

Figure 2:
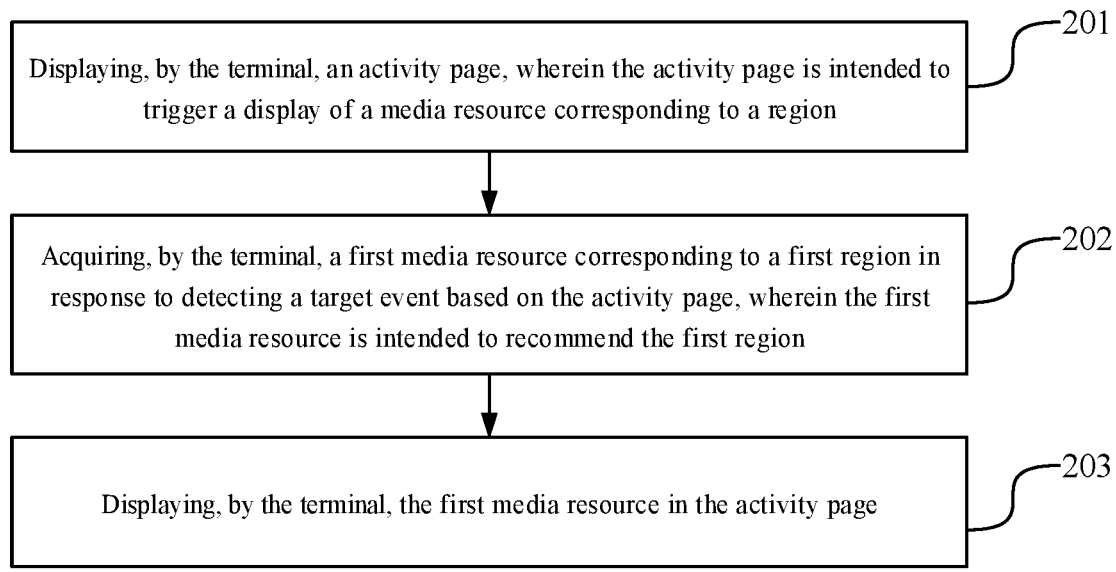
FIG. 2 is a flowchart of a method for displaying media resources according to an exemplary embodiment.

FIG. 2 is a flowchart of a method for displaying media resources according to an exemplary embodiment. As shown in FIG. 2, the method is applicable to a terminal and includes the following steps.

In step 201, an activity page is displayed by the terminal, and the activity page is configured to trigger a display of a media resource corresponding to a region.

In step 202, a first media resource corresponding to a first region is acquired in response to detecting a target event by the terminal based on the activity page, wherein the first media resource is configured to recommend the first region. For example, the first media resource is intended or used to recommend the first region.

In step 203, the first media resource is displayed in the activity page by the terminal.

In technical solutions according to embodiments of the present disclosure, when a target event is detected based on an activity page, an operation of displaying a media resource corresponding to a region can be triggered. In this way, a media resource of any region can be displayed by performing an operation corresponding to the target event, and media resources of different regions can be viewed without manual selection, thereby improving human-computer interaction efficiency.

Figure 3:
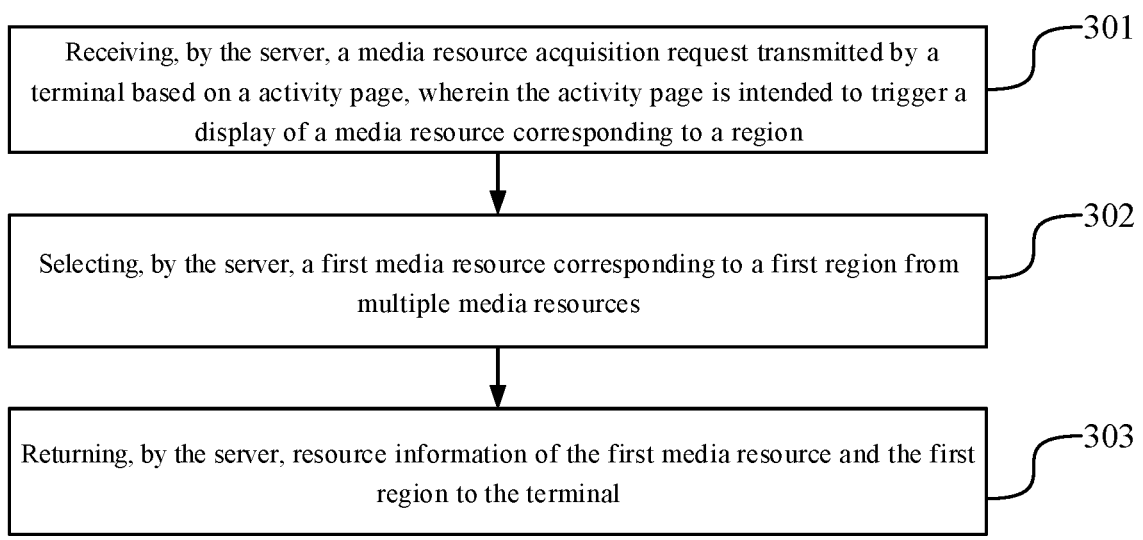
FIG. 3 is a flowchart of a method for displaying media resources according to another exemplary embodiment.

FIG. 3 is a flowchart of a method for displaying media resources according to another exemplary embodiment. As shown in FIG. 3, the method is inapplicable to a server and includes the following steps.

In step 301, a request for media resource acquisition transmitted by a terminal based on an activity page is received by the server, wherein the activity page is configured to trigger a display of a media resource corresponding to a region.

In step 302, a first media resource corresponding to first region is selected by the server from a plurality of media resources.

In step 303, resource information of the first media resource and the first region are returned by the server to the terminal.

In technical solutions according to embodiments of the present disclosure, when a target event is detected based on an activity page, an operation of displaying a media resource corresponding to a region can be triggered. In this way, a media resource of any region can be displayed by performing an operation corresponding to the target event, and media resources of different regions can be viewed without manual selection, thereby improving human-computer interaction efficiency.

Figure 4:
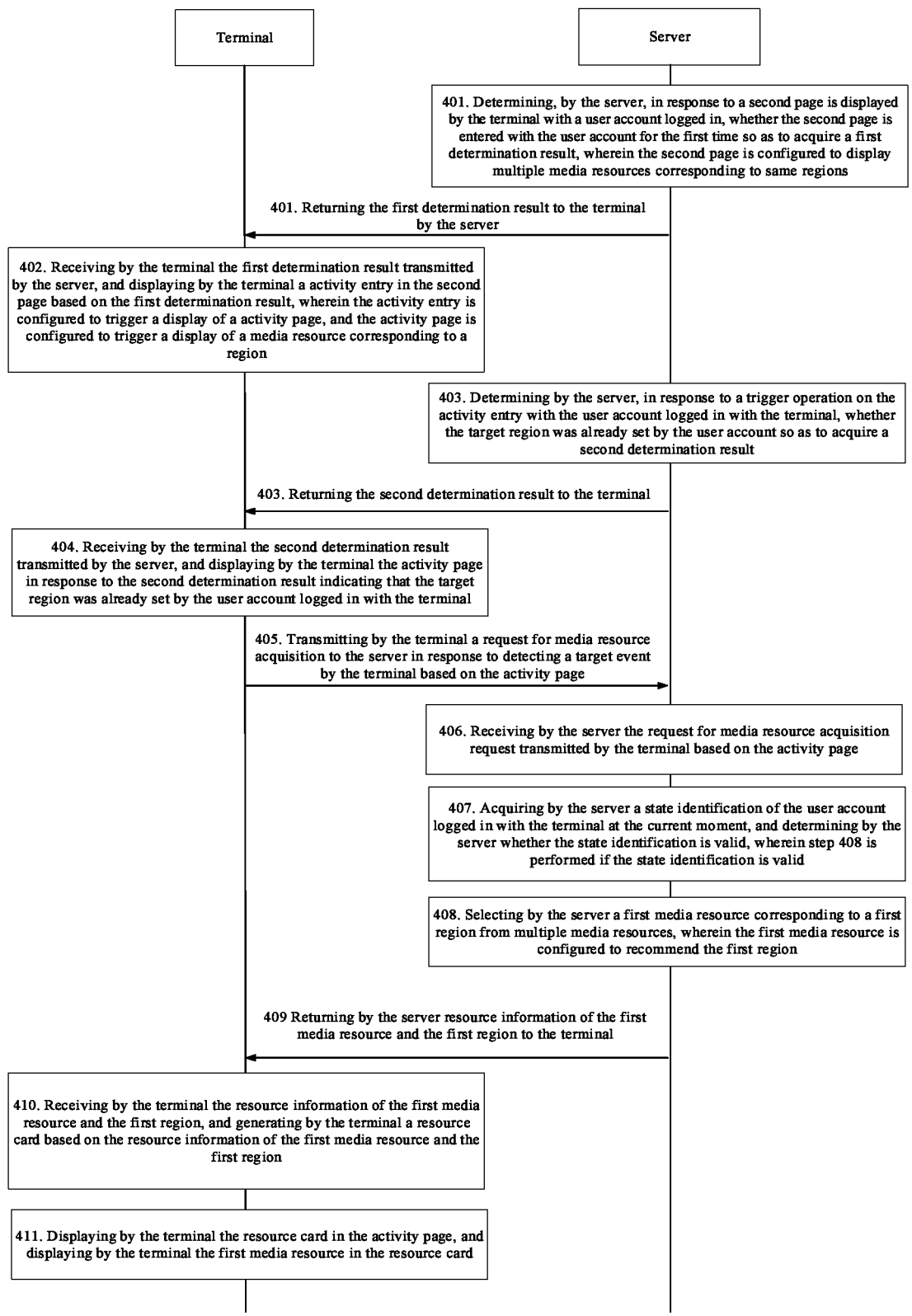
FIG. 4 is a flowchart of a method for displaying media resources according to still another exemplary embodiment.

FIG. 2 to FIG. 3 merely show basic processes of the present disclosure, and technical solutions according to the present disclosure are further illustrated below with a specific example. FIG. 4 is a flowchart of a method for displaying media resources according to still another exemplary embodiment, wherein a technical solution is illustrated in the method by taking an interaction process between a terminal and a server as an example. As shown in FIG. 4, the method includes:

In step 401, in response to a second page being displayed by the terminal with a user account logged in with the terminal, whether the second page is entered with the user account for the first time is determined by the server to acquire a first determination result; and the first determination result is returned to the terminal, wherein the second page is configured to display multiple media resources corresponding to the same regions.

The second page may be considered as an intra-city page which is configured to display multiple media resources with location tags of the same region. For example, the intra-city page displays multiple media resources of the same region as a region where the terminal is disposed. A type of the media resource is an image or a video. The first determination result is configured to indicate whether the second page is entered with the user account for the first time, that is, whether the second page is displayed for the first time under the condition that the terminal logs in the user account. In some embodiments, a media resource corresponding to a region is provided with a location tag belonging to the region, and the second page is configured to display a plurality of media resources corresponding to regions with location tags belonging to the same region. The location tag refers to a location tag corresponding to the media resource, for example, the location tag is a location where the media resource is posted, or the location tag is a city location corresponding to the media resource, such as the location tag corresponding to a picture captured for a city location is the city location. In some embodiments, the region is configured to indicate a city location. In some embodiments, the region may be an administrative region, and the administrative region may be a province, a city, or a finer division of an area unit, such as a community or a street and the like. The embodiments of the present disclosure do not limit a division mode of the administrative region. In other embodiments, the region may be a hot spot region, such as a certain scenic spot, a certain shopping mall, and so on.

Figure 5:
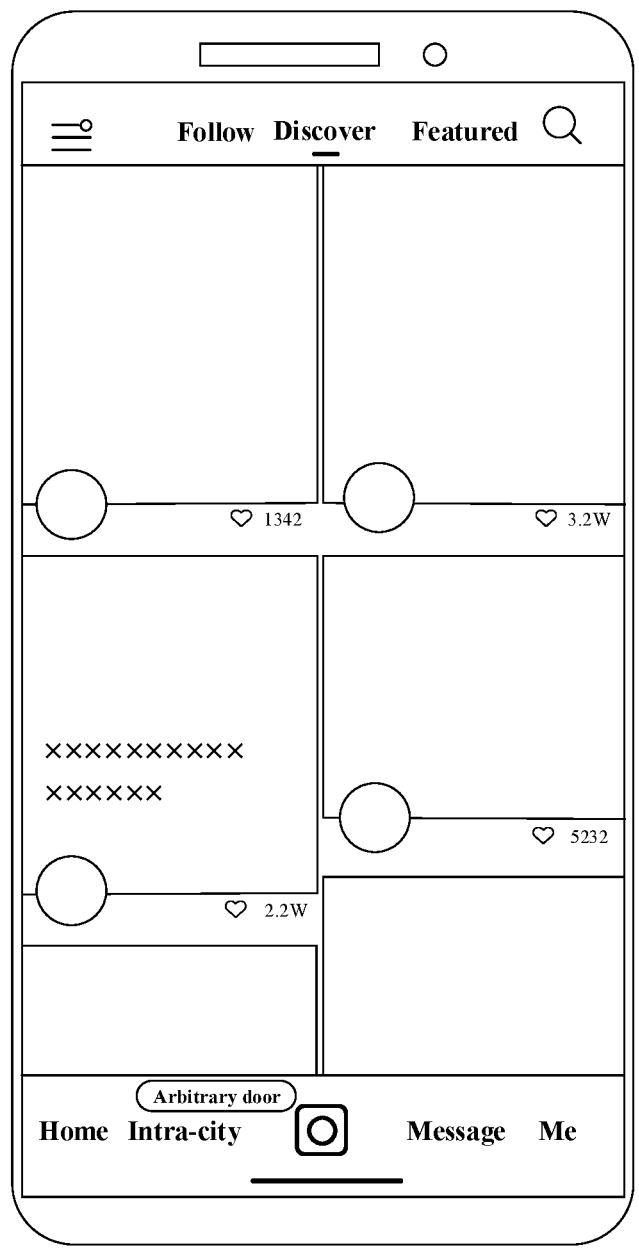
FIG. 5 is a schematic diagram of an interface of a target application according to an exemplary embodiment.

In some embodiments, when the user operates the terminal to activate the target application and log in the user account in the target application, an interface of the target application displays an intra-city tag configured for triggering a display of the second page. For example, when the second page is opened upon the trigger, what's displayed is the second page of the same region as the region where the terminal is disposed. That is, the second page is configured to display multiple media resources corresponding to the region where the terminal is located. For example, the region where the terminal is located is region A, the terminal displays the second page in response to a trigger operation on the intra-city tag, and the second page displays multiple media resources corresponding to the region A. For example, the interface of the target application referring to FIG. 5, and FIG. 5 is a schematic diagram of an interface of a target application according to an exemplary embodiment. FIG. 5 displays a Home-discover page, and the Home-discover page includes multiple media resources, as well as an intra-city tag, a home tag, a message tag, and a user tag, the text "Me" shown in FIG. 5 is the user tag. The home tag is configured to trigger a display of a homepage, the message tag is configured to trigger a display of a message record of the user account, and the user tag is configured to trigger a display of related information of the user account.

In some embodiments, when the user wants to view the second page, he/she performs a click operation on an intra-city tag in the interface of the target application, then the click operation on the intra-city tag is detected by the terminal and the second page is displayed in the interface of the target application, and this is a process of entering the second page with the user account. In response to the second page being entered with the user account, the server queries a displaying record corresponding to the user account to determine whether the displaying record includes identification of the second page, acquires the first determination result, and returns the first determination result to the terminal where the user account is disposed, wherein the presence of the identification indicates that the second page was displayed for the user account, i.e., the second page is entered with the user account not for the first time (the second page is displayed not for the first time under the condition that the terminal logs in the user account); and the absence of the identification indicates that the second page was not displayed for the user account, i.e., the second page is entered with the user account for the first time (the second page is displayed for the first time under the condition that the terminal logs in the user account). The first determination result is configured to indicate whether the second page is displayed for the first time under the condition that the terminal logs in the user account.

The step 401 is a process of determination based on the user account logged in with the terminal. It should be noted that, it is an optional condition that the user account is logged in with the terminal. In other embodiments, no user account is logged in with the terminal, and the server performs a subsequent determination process based on the terminal's identification (ID), so as to achieve a basic function of displaying media resources.

In step 402, the terminal receives the first determination result transmitted by the server, and displays an activity entry in the second page based on the first determination result. The activity entry is configured to trigger a display of an activity page, and the activity page is configured to trigger a display of a media resource corresponding to a region.

It should be noted that, the activity entry is an entry corresponding to a target activity, and the activity page is a page corresponding to a target activity. The target activity refers to an activity of displaying a media resource of a region. In the embodiments of the present disclosure, the technical solution is described subsequently by taking a target activity of "shake to open arbitrary doors" as an example.

In some embodiments, after receiving the first determination result transmitted by the server, the terminal displays the activity entry in a corresponding displaying mode based on contents indicated by the first determination result.

Figure 6:
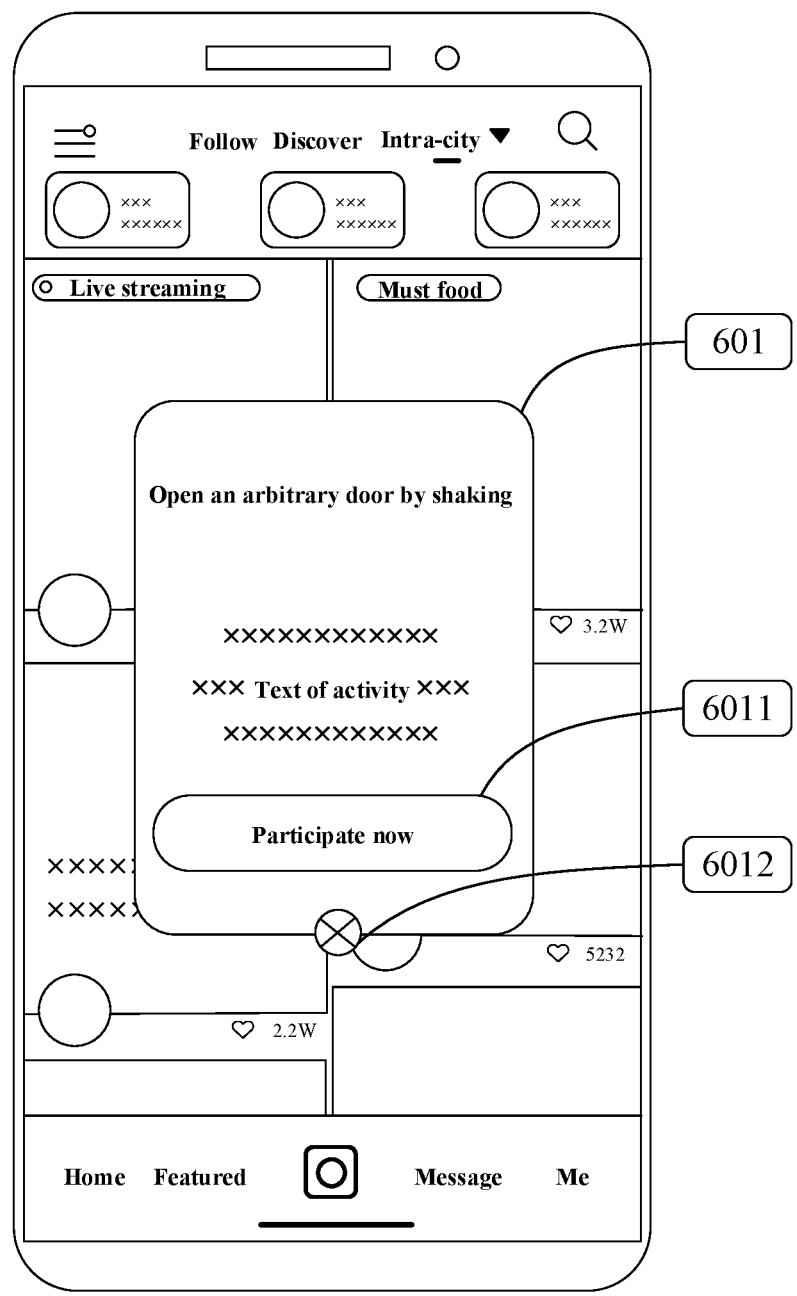
FIG. 6 is a schematic diagram of an intra-city page according to an exemplary embodiment.

In some embodiments, a displaying process of the activity entry performed by the terminal includes any one of the follows:

In some embodiments, in response to the operation of entering the second page with the user account logged in with the terminal for the first time, that is, the second page is displayed for the first time under the condition that the terminal logs in the user account, the terminal displays the activity entry in the second page in the form of a pop-up window. For example, taking a fact that the target activity is the activity of "shake to open arbitrary doors" as an example, the second page may be an intra-city page displayed in FIG. 6. FIG. 6 is a schematic diagram of an intra-city page according to an exemplary embodiment. The intra-city page displays multiple media resources with location tags of the same region, the activity entry may be an activity entry 601 of the activity of "shake to open arbitrary doors" as shown in FIG. 6, and it may be noted that the activity entry 601 is displayed in the form of a pop-up window. The activity entry 601 shown in FIG. 6 includes a target activity name, an activity text of the target activity, a participate-now control 6011, and a close control 6012. The participate-now control 6011 is configured to trigger a display of the activity page. The close control 6012 is configured to trigger closing of the activity entry 601. It should be noted that, in this embodiment, the activity entry may be considered as a guide entry, and the pop-up window is a guide pop-up window for guiding the user to enter the activity page. In this embodiment, displaying, by the terminal, the entry in the form of a pop-up window for the user account that enters the intra-city page for the first time, may guide the user entering the intra-city page for the first time to quickly participate in the target activity.

Figure 7:
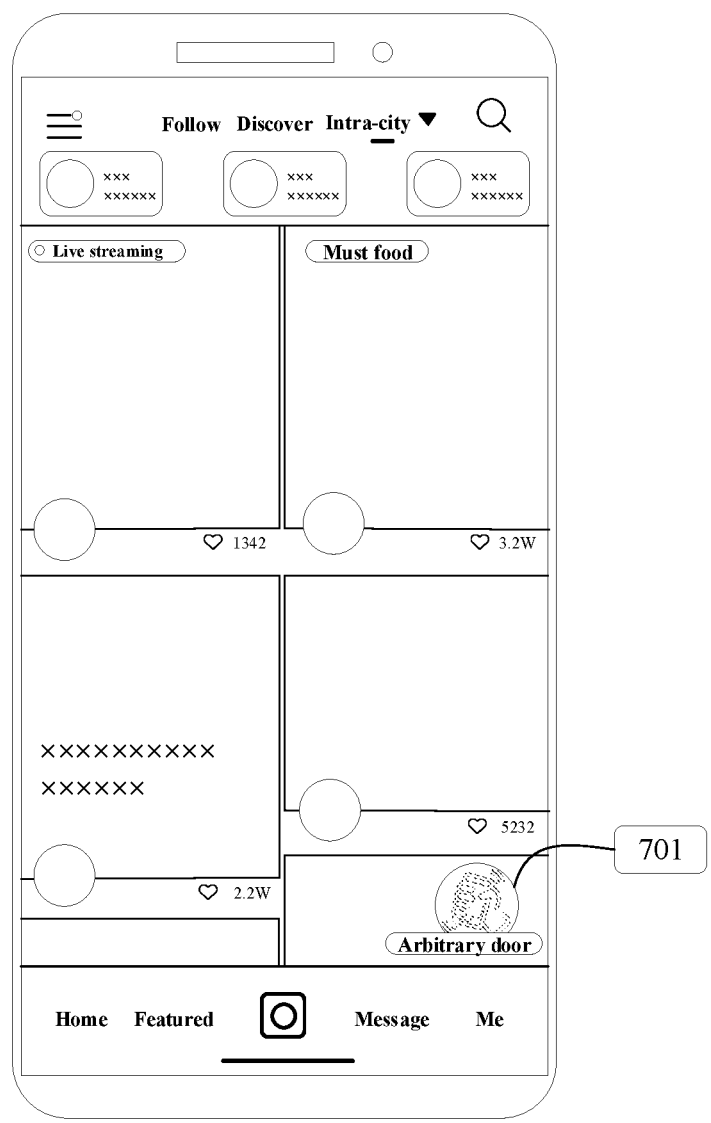
FIG. 7 is a schematic diagram of an intra-city page according to another exemplary embodiment.

In yet other embodiments, in response to the operation of entering the second page with the user account logged in with the terminal not for the first time, that is, the second page is displayed not for the first time under the condition that the terminal logs in the user account, the terminal displays the activity entry in the second page in the form of a widget. For example, taking a fact that the target activity is the activity of "shake to open arbitrary doors" as an example, the second page may be an intra-city page shown in FIG. 7. FIG. 7 is a schematic diagram of another intra-city page according to an exemplary embodiment. In the intra-city page, the activity entry may be an arbitrary door activity entry 701 displayed in the lower right corner of FIG. 7, and it may be noted that the arbitrary door activity entry 701 is displayed in the form of a widget. In this embodiment, displaying, by the terminal, the entry in the form of a widget for the user account that enters the intra-city page not for the first time, may satisfy the user's use needs and improve the user's use experience.

It should be noted that the step 402 is a process of displaying the activity entry in the second page (that is, the intra-city page). The second page is a page associated with the activity page. In other embodiments, the terminal can also display the activity entry in other page associated with the activity page beside the second page. That is, the terminal displays the activity entry in the first page, wherein the first page is a page associated with the activity page. For example, the first page may be the home page. The terminal displays the activity page in response to a trigger operation on activity entry. If the first page is displayed for the first time under the condition that the terminal logs in the user account, the terminal displays the activity entry in the first page in the form of the pop-up window, if the first page is displayed not for the first time under the condition that the terminal logs in the user account, the terminal displays the activity entry in the first page in the form of the widget. By this process, the user may also enter the activity page via the activity entry shown in other pages, which improves the user's operating experience, enriches the way of displaying the activity page, and improves the flexibility of human-computer interaction. In addition, the technical solution is described in the above process by taking the target activity as an example. In other embodiments, the target activity may also serve as a sub-activity of some main venue activities, and the terminal displays the activity entry in a page of the main venue entry. For example, the activity entry is shown in the form of a pop-up window or a widget in the page of main venue activities.

It should be also noted that, though in the above step 401 to step 402 a process of determination performed by the server is described, in other embodiments, the process of determination may also be performed by the terminal.

In step 403, in response to a trigger operation on the activity entry with the user account logged in with the terminal, the server determines whether the target region was already set by the user account and acquires a second determination result, and returns the second determination result to the terminal.

It should be explained that, in the embodiment of the present disclosure, a setting function on a target region is provided for the user account. For example, a target region set by the user account logged in with the terminal is a region that the user is interested in. Alternatively, the target region set by the user account is also a target region where he stays currently as the region. The embodiment of the present disclosure does not limit the region set by the user account. In some embodiments, a corresponding process of setting the target region is as follows: the user performs a selecting operation on a region of interest in multiple regions preset by the server through the target application, and the terminal determines the target region set by the user account in response to the selecting operation of the user account and transmit the target region set by the user account to the server for storage. In a subsequent example, the target region set by the user account is represented by a desired city.

In some embodiments, when the user wants to view the activity page, he/she performs a click operation on the activity entry in the second page. In responds to this trigger operation on the activity entry, the terminal transmits to the server prompt information about the trigger operation on the activity entry by the user. After receiving the prompt information, the server, queries region setting information of the user account, acquires the second determination result, and transmits the second determination result to the terminal, wherein if the region setting information contains identification of the target region, it means that the target region was already set by the user account; and if the region setting information contains no identification of the target region, it means that the target region was not set by the user account. The region setting information stores the corresponding relationship between the user account and the target region set by the user account, and the second determination result is configured to indicate whether the user account has set the target region.

In step 404, the terminal receives the second determination result transmitted by the server, and displays the activity page in response to the second determination result indicating that the target region was already set by the user account logged in with the terminal.

Figure 8A:
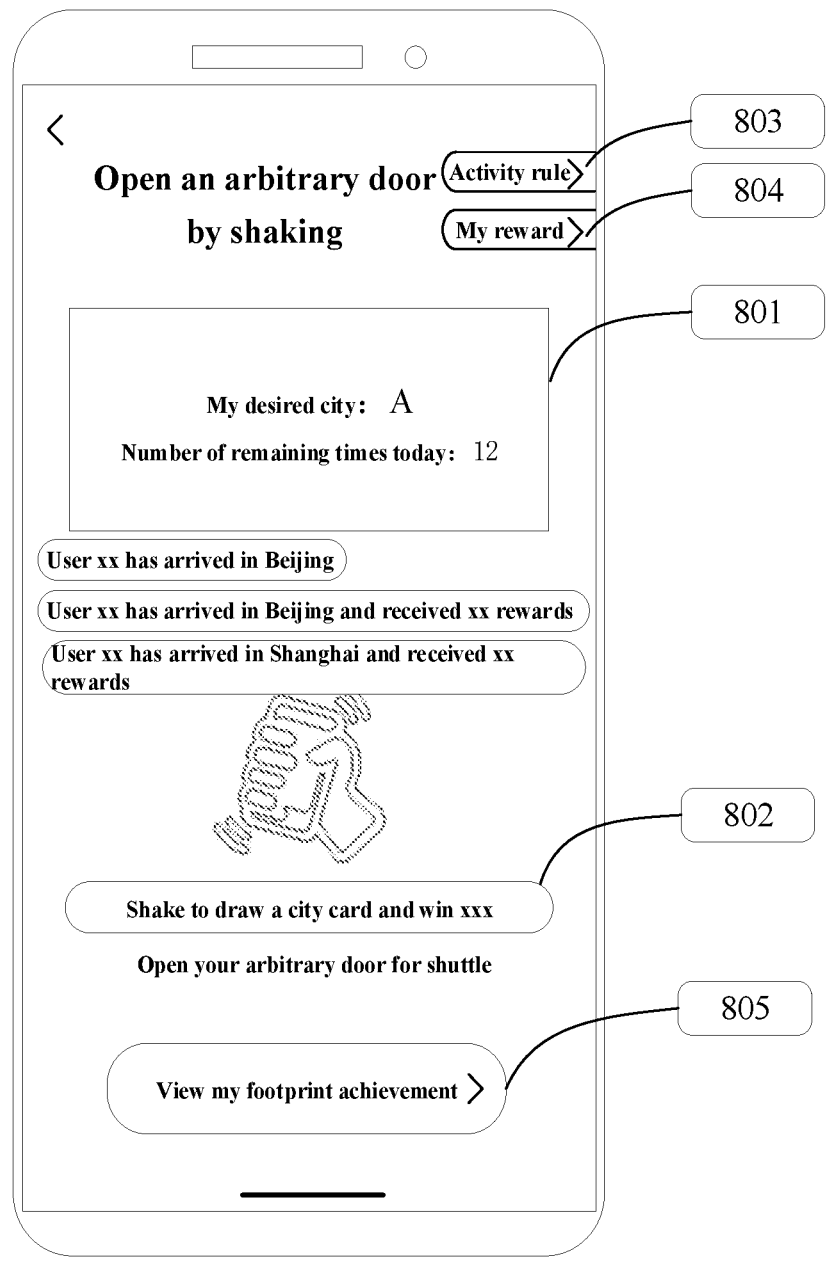
FIG. 8A is a schematic diagram of an activity page according to an exemplary embodiment.
Figure 8B:
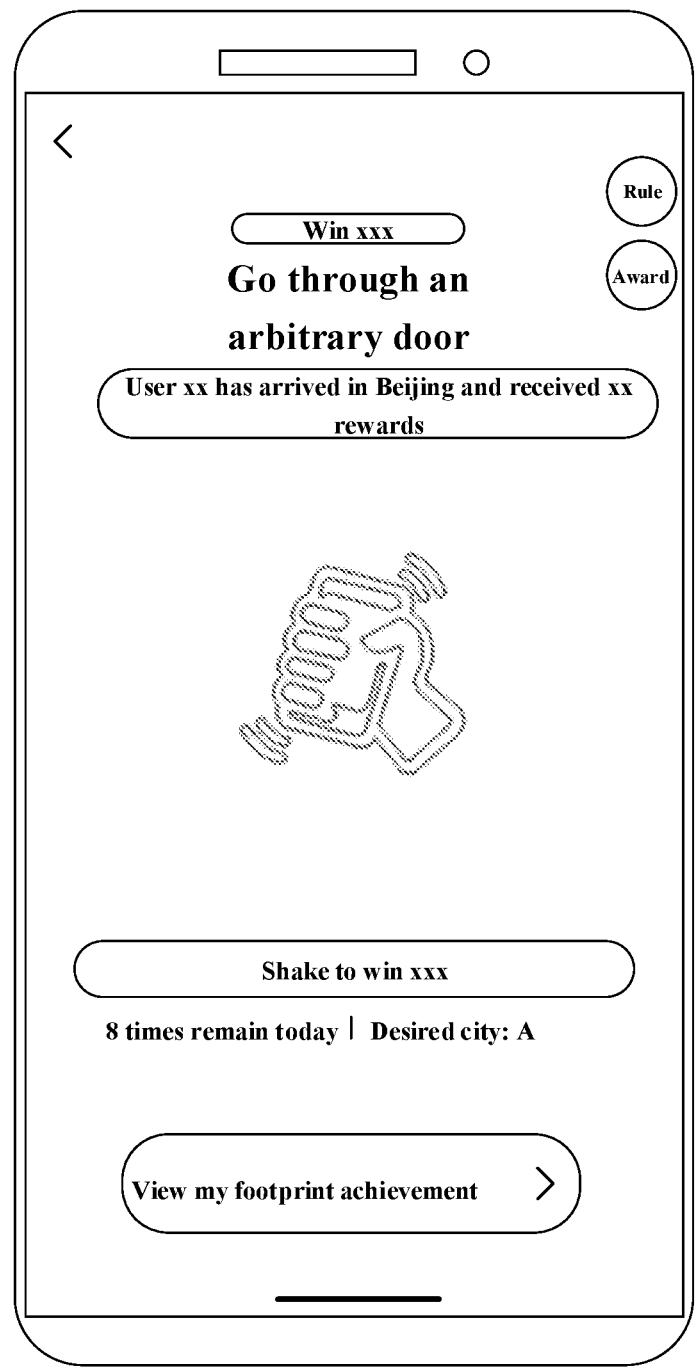
FIG. 8B is a schematic diagram of an activity page according to another exemplary embodiment.

For example, taking a fact that the target activity is the activity of "shake to open arbitrary doors" as an example, the activity page may be a page shown in FIG. 8A or FIG. 8B. FIG. 8A is a schematic diagram of an activity page according to an exemplary embodiment. The activity page shown in FIG. 8A includes a target activity name, a desired city prompt box 801 and a shaking prompt box 802. The desired city prompt box 801 is configured to provide a prompt of a desired city of the user account, such as "a desired city is A", the desired city of the user account is the target region set by the user account. The shaking prompt box 802 is configured to prompt the user to shake the terminal. In addition, as shown in FIG. 8A, the activity page further includes an activity-rule control 803 and a my-reward control 804. The activity-rule control 803 is configured to trigger a display of contents of an activity rule. The my-reward control 804 is configured to trigger a display of a reward record of the user account. FIG. 8B is a schematic diagram of an activity page according to another exemplary embodiment, which includes the target activity name, the shaking prompt box, the activity-rule control and the my-reward control. Regarding contents related to the prompt box and the controls in FIG. 8B, reference may be made to FIG. 8A, and specific description is omitted.

In some embodiments, the terminal further displays a third control in the activity page, wherein the third control is configured to trigger a display of media resources that have been displayed for the user account. For example, the third control may be a view-my-footprint-achievement control 805 as shown in FIG. 8. When the user wants to view his/her own resource record (footprint achievement), he/she performs a click operation on the third control (view-my-footprint-achievement control 805) in the activity page. In response to this trigger operation on the third control, the terminal displays a resource record page which includes media resources that have been displayed for the user account logged in with the terminal, and the media resources may be viewed by performing a click operation on the media resources in the resource record page.

Figure 9A:
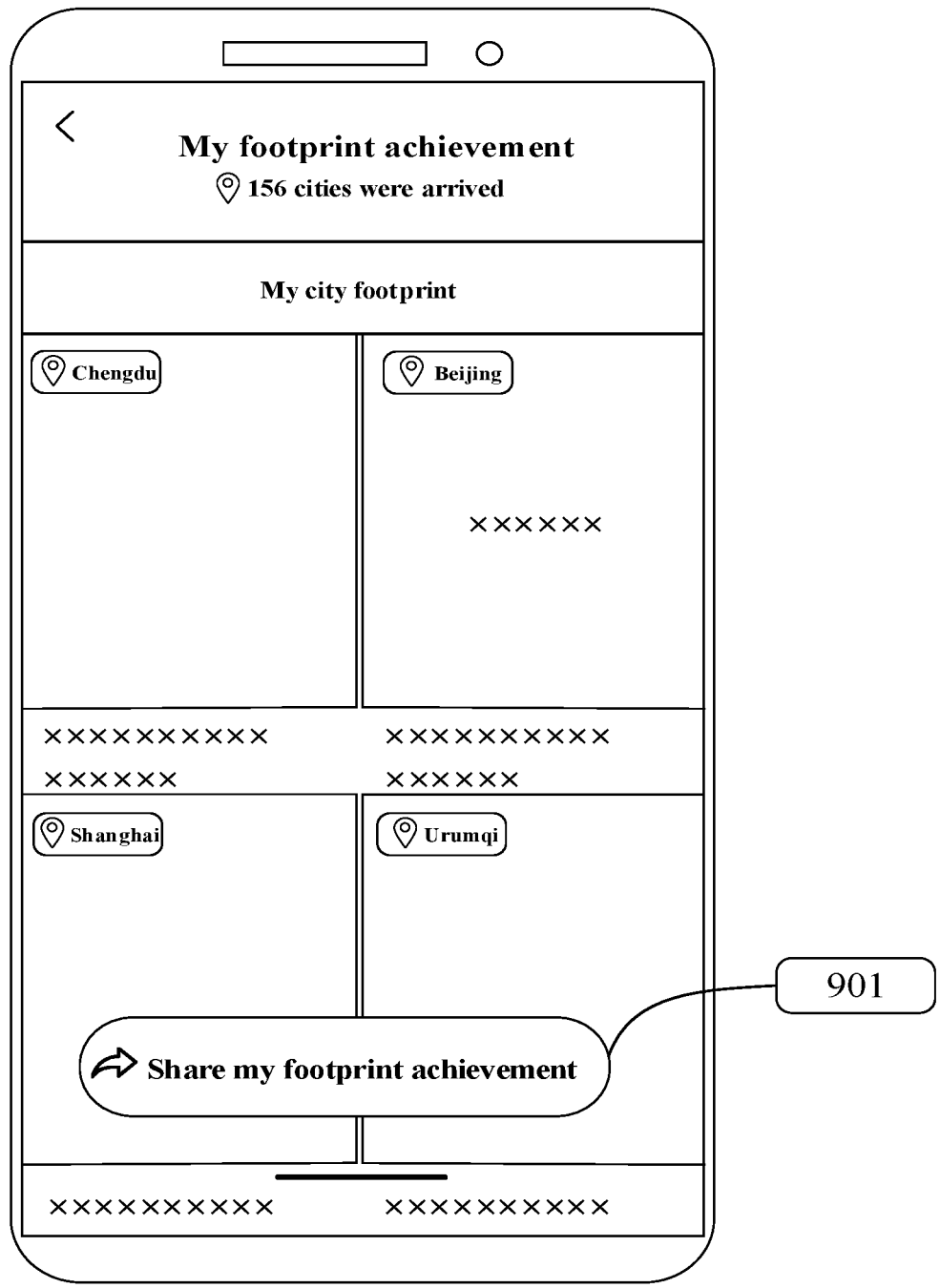
FIG. 9A is a schematic diagram of a resource record page according to an exemplary embodiment.
Figure 9B:
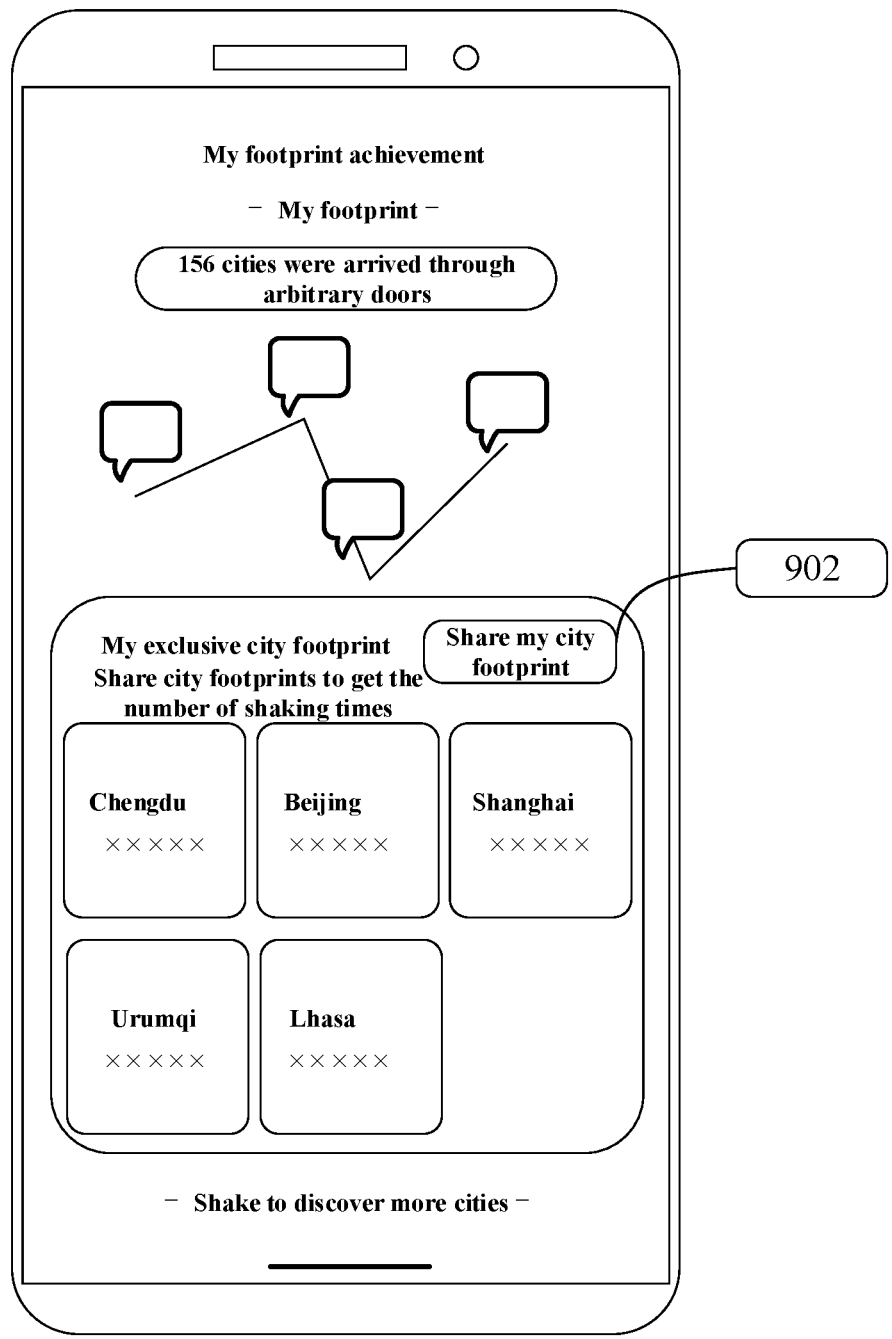
FIG. 9B is a schematic diagram of a resource record page according to another exemplary embodiment.

For example, for the resource record page, reference may be made to FIG. 9A or FIG. 9B. FIG. 9A is a schematic diagram of a resource record page according to an exemplary embodiment, and the resource record page shown in FIG. 9A contains multiple media resources that have been displayed for the user account, that is, media resources corresponding to regions that have been displayed for the user account. FIG. 9B is a schematic diagram of a resource record page according to another exemplary embodiment. The resource record page shown in FIG. 9B displays multiple media resources that have been displayed for the user account and pieces of footprint introduction information, such as the number of cities arrived (e.g., 156), route introductions of the cities arrived, resource introduction information of the cities arrived, text introduction information of the cities arrived, and a share-my-city-footprint control 902. In some embodiments, when detecting a click operation on any media resource in the resource record page, the terminal performs an operation of jumping to an intra-city page in the same region as a region of said any media resource. For example, if the user clicks a media resource corresponding to Chengdu in the resource record page shown in FIG. 9A, an operation of jumping to an intra-city page of Chengdu is performed and the intra-city page display multiple media resources corresponding to Chengdu.

In some embodiments, the terminal displays a fourth control in the resource record page, wherein the fourth control is configured to trigger an operation of sharing the media resources that have been displayed for the user account logged in with the terminal. For example, the fourth control may be a share-my-footprint-achievement control 901 in FIG. 9A or the share-my-city-footprint control 902 in FIG. 9B.

Figure 10:
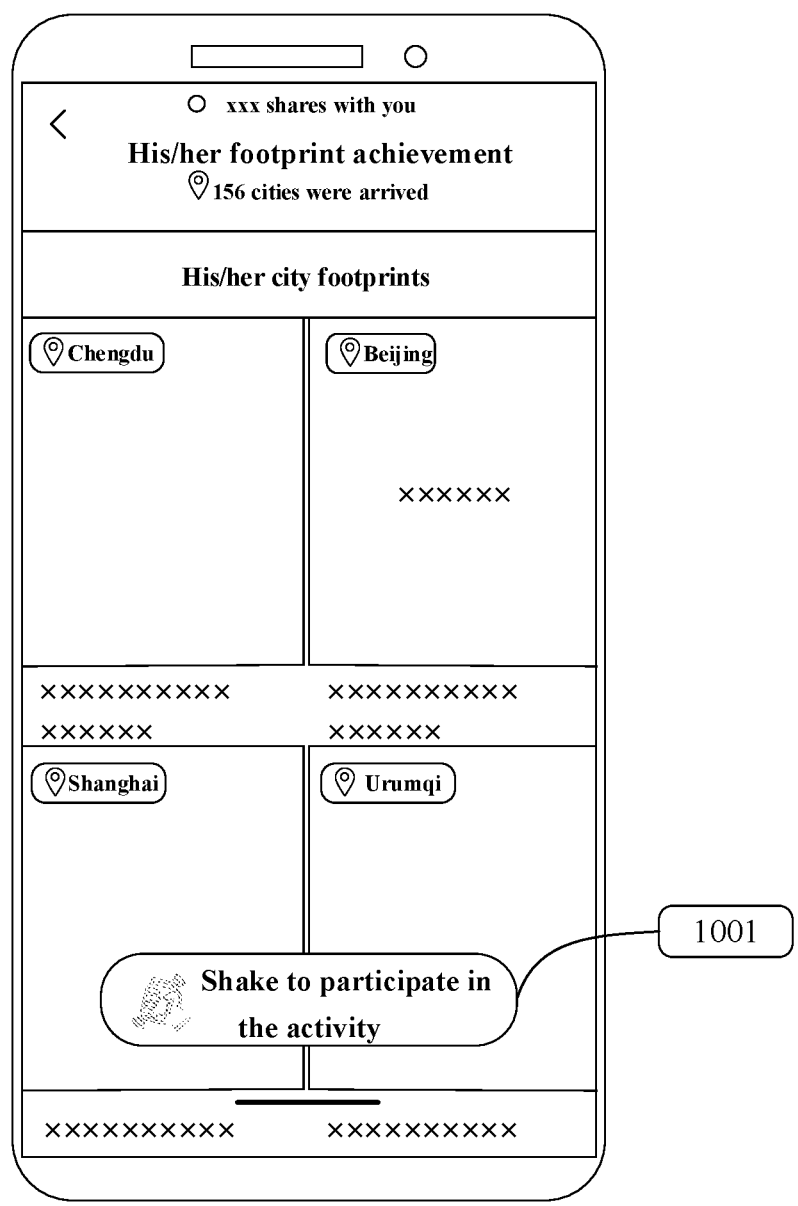
FIG. 10 is a schematic diagram of a sharing page according to an exemplary embodiment.

A process of sharing, by the terminal, based on the fourth control in the resource record page includes any one of the follows:

In some embodiments, when a user wants to share his/her own resource record (footprint achievement), he/she performs a click operation on the fourth control (the share-my-footprint-achievement control 901) in the resource record page; then the terminal detects this trigger operation on the fourth control, and shares the resource record of the user account to a target object, for example, the target object is a user account associated with the user account, or the target object is a user account in the group where the user account is located, and the like. The resource record of the user includes the media resources that have been displayed for the user account. For example, subsequent to FIG. 9A, after sharing the media resources that have been displayed for the user account to the target object by the terminal where the user account is disposed, a terminal where the target object is disposed displays a sharing page as shown in FIG. 10. FIG. 10 is a schematic diagram of a sharing page according to an exemplary embodiment. The sharing page shown in FIG. 10 includes media resources in a resource card that has been displayed for the user account, that is, media resources corresponding to regions that have been displayed for the user account. In addition, the terminal where the target object is disposed displays a shake-to-participate-in-the-activity control 1001 in the sharing page, wherein the shake-to-participate-in-the-activity control 1001 is configured to trigger a display of the activity page. The shake-to-participate-in-the-activity 1001 may attract more users to participate in activities.

Figure 11:
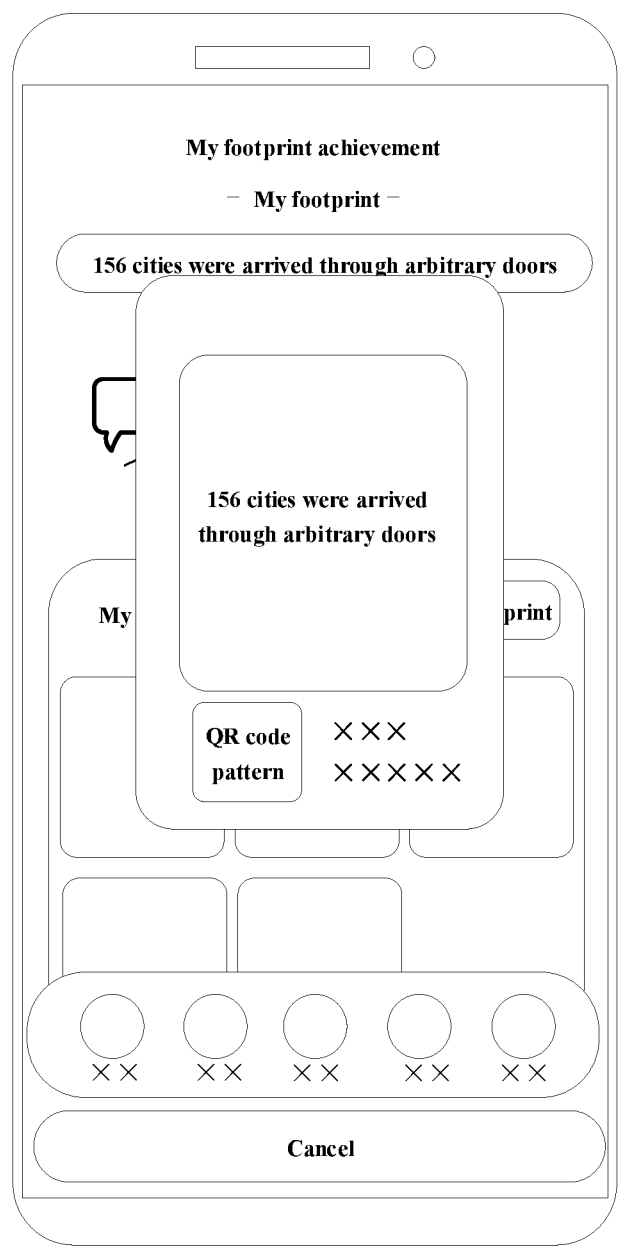
FIG. 11 is a schematic diagram of a page where a sharing card is disposed according to an exemplary embodiment.

In other embodiments, when a user wants to share his/her own resource record, he/she performs a click operation on the fourth control (the share-my-city-footprint control 902)

in the resource record page; then the terminal detects this trigger operation on the fourth control, generates a sharing card, and shares the resource record of the user account to the target object in the form of the sharing card. In some embodiments, the sharing card is a resource card which is configured to display the media resources in the resource record. In some embodiments, the sharing card is a footprint-achievement card which indicates the regions of the media resources in the resource record, that is, the footprint-achievement card is configured to display the regions that have been displayed by the user account. For example, subsequent to FIG. 9B, when detecting a click operation on the share-my-city-footprint control 902, the terminal generates a sharing card as shown in FIG. 11. FIG. 11 is a schematic diagram of a page where a sharing card is disposed according to an exemplary embodiment. The sharing card shown in FIG. 11 includes city footprint prompt information, a QR code pattern, and user account information. The city footprint prompt information is configured to provide a prompt of the user account's brief city footprint information, for example, 156 cities arrived. The user account information includes a user account name or a user account profile photo, etc. The sharing card shown in FIG. 11 is the footprint-achievement card. In addition, the page shown in FIG. 11 further includes icons of multiple social applications. It should be noted that, through any social application, the sharing card of the user account may be transmitted to a terminal where a user account of a friend of the user is disposed. In this process, since a region has geographic attributes, footprint information of the resource card popped up for the user may be recorded, and the user's own resource card and footprint achievement card may be shared, such that the user may get satisfaction. In addition, sharing the card with friends of the user may attract more users to participate in activities, and the amount of information displayed on the terminal is increased.

It should be noted that, in the foregoing embodiment, a fact that the third control is configured to trigger a display of media resources that have been displayed for the user account logged in with the terminal is taken as an example. In other embodiments, the third control is further configured to trigger a display of media resources that have been clicked by the user account logged in with the terminal. It should be noted that, the media resources that have been displayed refer to media resources that have been displayed for the user account and have not been clicked for playback, and the media resources that have been clicked refer to media resources that have been displayed for the user account and have been clicked for playback. The embodiment of the present disclosure does not limit that a display of which resource is trigger by the third control.

Figure 12A:
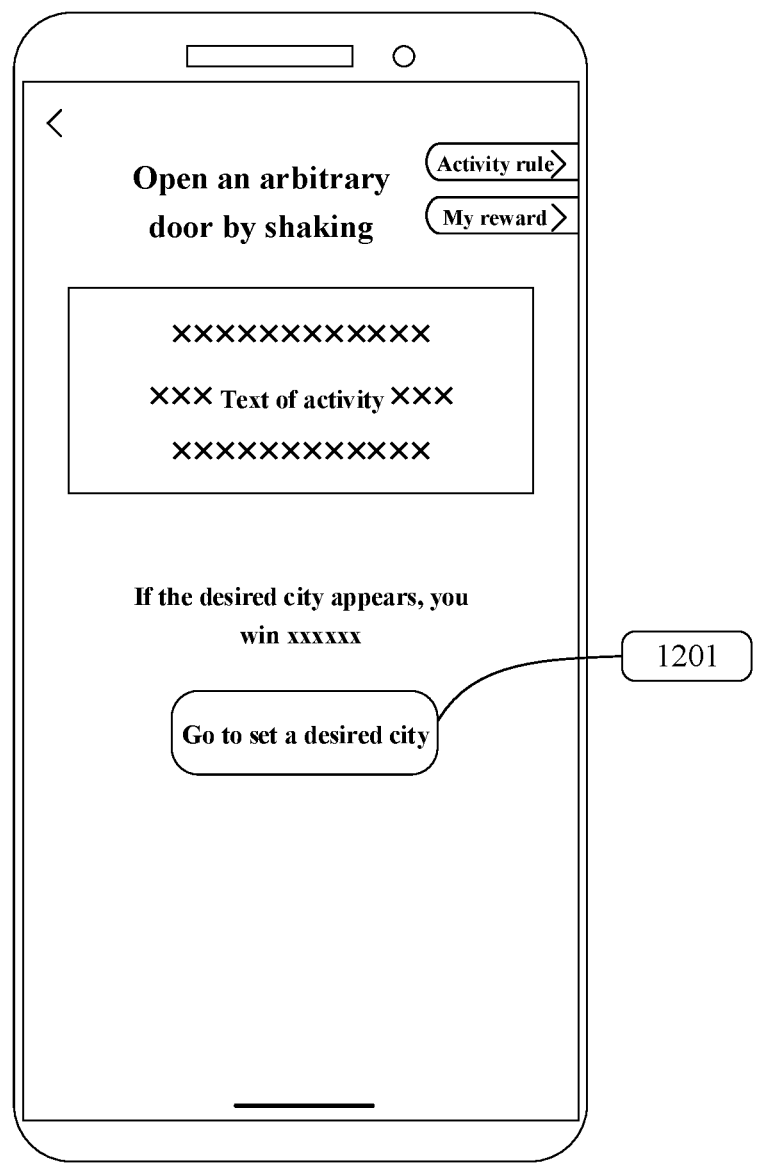
FIG. 12A is a schematic diagram of a region filling page according to an exemplary embodiment.
Figure 12B:
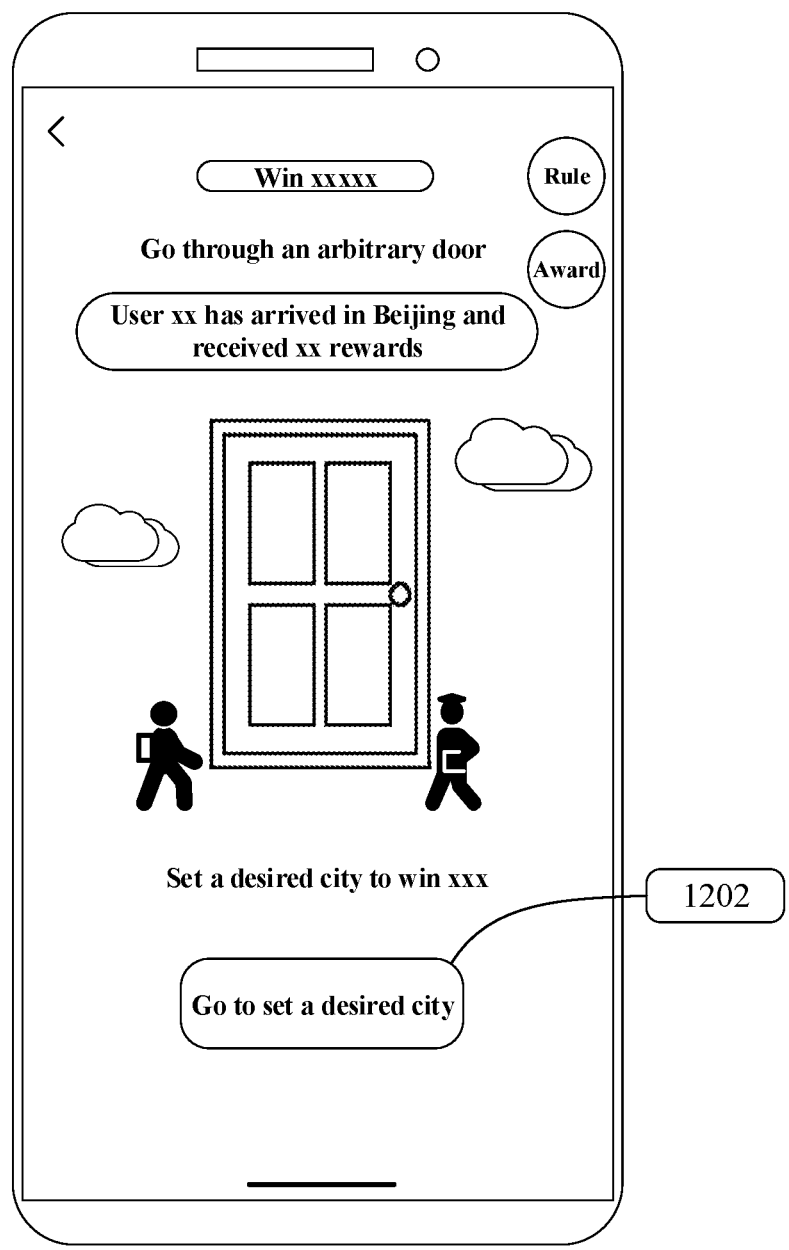
FIG. 12B is a schematic diagram of a region filling page according to another exemplary embodiment.

In the step 404, a process is described in which the activity page is displayed when the second determination result indicates that the target region was set by the user account logged in with the terminal. In other embodiments, when the second determination result indicates that the target region was not set by the user account logged in with the terminal, a region filling page is displayed, wherein the region filling page is configured to set the target region by the user account. That is, the terminal displays the activity page when the target region has been set by the user account; and the terminal displays the region filling page when the target region has not been set by the user account. Optionally, the terminal displays a region filling control in the region filling page, wherein the region filling control is configured for the user account to fill in a region. For example, taking a fact that the target activity is the activity of "shake to open arbitrary doors" as an example, the region filling page may be a page in FIG. 12A or FIG. 12B. FIG. 12A is a schematic diagram of a region filling page according to an exemplary embodiment, and the region filling control may be a go-to-set-a-desired-city control 1201 shown in FIG. 12A. FIG. 12B is a schematic diagram of another region filling page according to an exemplary embodiment, and the region filling control may be a go-to-set-a-desired-city control 1202 displayed in FIG. 12B. Though the region filling page is described in the above process in which the region filling control is contained as an example, in other embodiments, the terminal displays a region filling box in the region filling page, wherein the region filling box is configured to be filled with a region. It should be noted that, after filling in a region by the user, the terminal displays the activity page in the region filling page in response to the filling being completed.

It should be noted that, steps 403 to 404 are optional steps. User accounts that have not set the target region (desired city) may also participate in target activity. That is, the terminal also displays the activity page in the case that the target region has not been set by the user account.

In step 405, when a target event is detected by the terminal based on the activity page, the terminal transmits the request for media resource acquisition to the server.

In some embodiments, the target event may be any one of the follows: an operation of shaking the terminal, an operation of clicking a target region in the activity page, a trigger operation on controls in the activity page and an operation of receiving an audio instruction carrying a keyword. For example, the operation of shaking the terminal refers to a shaking operation on the terminal. The above-mentioned activity of "shake to open arbitrary doors" refers to an activity of triggering the terminal to display a media resource of a region by the shaking operation. An operation of displaying a subsequent media resource by a trigger operation of shaking may bring a sense of travel to the user and increase an interest of the target activity.

In some embodiments, if a target event is detected by the terminal based on the activity page, a resource card is acquired. A process of acquiring a resource card is described in step 405 to step 410.

In step 406, the server receives the request for media resource acquisition transmitted by the terminal based on the activity page.

In some embodiments, after receiving the request for media resource acquisition transmitted by the terminal based on the activity page, the server acquires identification of the user account from a specific field of the request for media resource acquisition, and then performs subsequent processes based on the identification of the user account.

In step 407, the server acquires a state identification of the user account logged in with the terminal, and determines whether the state identification is valid. If the state identification is valid, then step 408 is performed.

The state identification is configured to indicate the number of remaining activity times for the target activity. That is, the state identification is configured to indicate whether the user account has a permission for acquiring media resources. If the number of remaining activity times of the target activity is 0, it means that the user account has no permission for acquiring media resources. If the number of remaining activity times of the target activity is not 0, it means that the user account has the permission for acquiring media resources. A valid state identification may be indicated by the sufficient number of remaining activity times, for example, the number of remaining activity times is equal to or greater than one, that is, the valid state identification means that the user account has the permission for acquiring media resources.

In some embodiments, after acquiring the identification of the user account, the server determines the number of remaining activity times of the user account at the current moment based on the identification of the user account and a correspondence between the identification and the number of remaining activity times. It is determined whether the number of remaining activity times is greater than or equal to one, and if the number of remaining activity times is greater than or equal to one, a process of selecting a media resource is performed. The number of remaining activity times may be the number of remaining times today in the activity page shown in FIG. 8.

In other embodiments, if the state identification is invalid, state prompt information is transmitted to the terminal. The state prompt information is configured to provide a prompt of a resource shortage of a target activity. That is, the server selects the first media resource if the state identification is valid, and transmits the state prompt information to the terminal if the state identification is invalid, the state prompt information is configured to indicate that the user account has no permission for acquiring media resources. In other words, if the number of remaining activity times is less than one, number-of-activity-times prompt information is transmitted to the terminal, wherein the number-of-activity-times prompt information is configured to provide a prompt of the insufficient number of remaining activity times of a target activity. After receiving the number-of-activity-times prompt information transmitted by the server, the terminal displays the number-of-activity-times prompt information in the activity page to indicate that the number of remaining activity times is insufficient for the user, that is, the activity has ended, the user account has no permission for acquiring media resources. In some embodiments, after receiving the number-of-activity-times prompt information transmitted by the server, the terminal displays the number-of-activity-times prompt information in the activity page by displaying a floating toast. The toast is a type of message prompt box configured to quickly display a small amount of information. In some embodiments, when displaying the state prompt information in the activity page, the terminal displays guide prompt information configured to provide a prompt of activity tasks by which the number of activity times may be acquired, the user account can acquire permission by the activity. For example, the activity tasks are sharing tasks, browsing tasks, and so on. In this process, by displaying the guide prompt information, the user is guided to acquire the number of activity times through the activity tasks, thereby increasing the diversity of human-computer interaction.

It should be noted that the step 407 is optional. In other embodiments, the server may perform a step 408 after receiving a request for media resource acquisition transmitted by the terminal based on the activity page.

In the step 408, the server selects a first media resource corresponding to a first region from multiple media resources, wherein the first media resource is configured to recommend the first region.

In some embodiments, a process of determining a first media resource by the server includes any one of the follows:

In some embodiments, the server randomly selects a media resource from multiple media resources as the first media resource, and takes a region corresponding to the first media resource as the first region.

In other embodiments, the server selects one region of multiple regions as the first region, and then randomly selects, from multiple media resources corresponding to the first region, a media resource as the first media resource.

By both the above-described two kinds of modes of selecting the first media resource, a media resource to be pushed may be quickly determined and quickly issued, thereby improving efficiency of displaying media resources. Moreover, by this random issuing mode, a display of media resources of different regions, instead of a display of media resources of the same region only, can be realized, thereby improving an interest of activities.

In step 409, the server returns resource information of the first media resource and the first region to the terminal.

In some embodiments, after determining the first media resource corresponding to the first region, the server returns resource information of the first media resource and the first region to the terminal, so as to display the media resource.

In Step 410, the terminal receives the resource information of the first media resource and the first region, and generates a resource card based on the resource information of the first media resource and the first region.

In some embodiments, the terminal is provided with a style template of a resource card. After receiving the resource information of the first media resource and the first region the terminal writes the resource information of the first media resource and the first region into the style template, that is, the terminal generates a resource card by writing the resource information of the first media resource into a corresponding display area, and writing the first region into a corresponding display area.

In step 411, the terminal displays the resource card in the activity page, and displays the first media resource in the resource card.

In some embodiments, the terminal displays the resource card in the activity page with a preset special effect in a transition animation, such as a special effect of a pop-up card, or a special effect of gradual changes, and displays the first media resource in the resource card. It should be noted that, in some embodiments, when displaying the first media resource, a cover image of the first media resource is displayed, and a viewing control is provided in the cover image, wherein the viewing control is configured to trigger playback of the first media resource; in other embodiments, when displaying the first media resource, the first media resource is automatically played based on the resource information of the first media resource, so as to achieve an effect of seamless playback.

Figure 13:
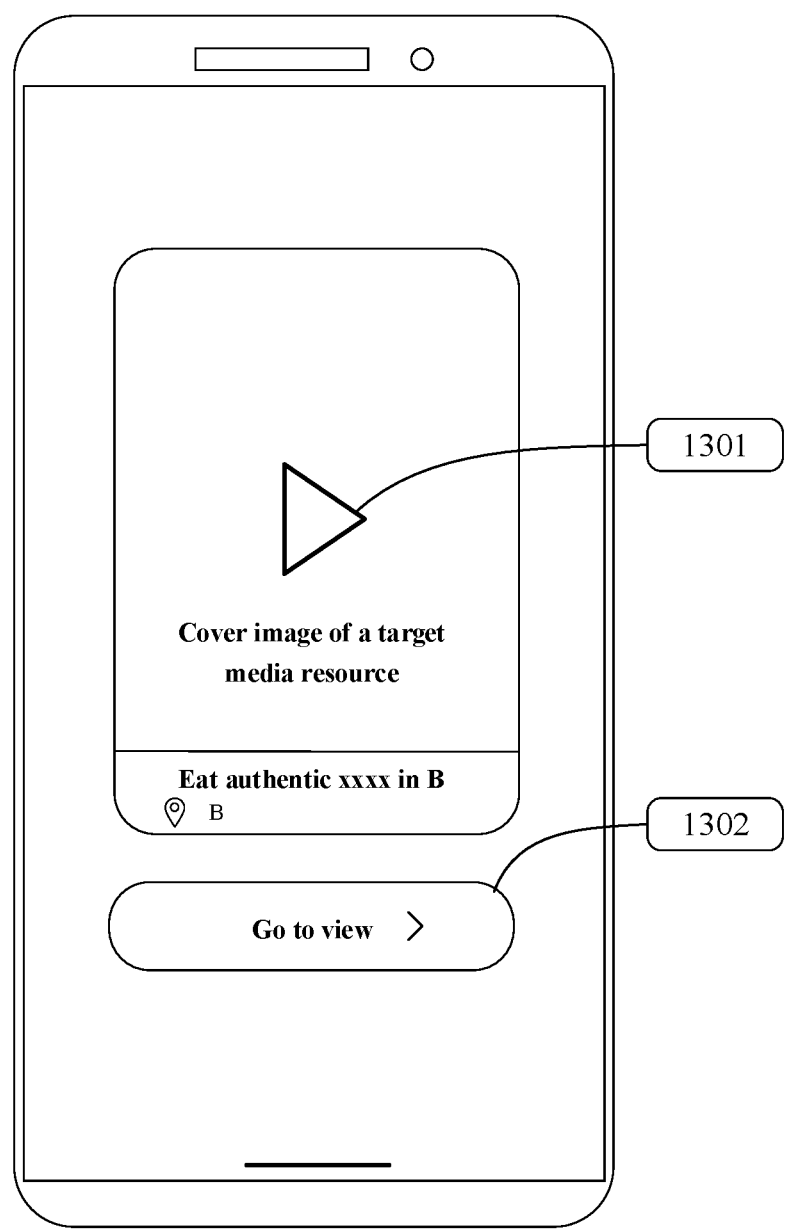
FIG. 13 is a schematic diagram of displaying a resource card according to an exemplary embodiment.

For example, taking a fact that the first region is B and the cover image includes a viewing control as an example, a process of displaying the resource card may be seen in FIG. 13. FIG. 13 is a schematic diagram of displaying a resource card according to an exemplary embodiment. The resource card in FIG. 13 is displayed in the form of a pop-up card, and the viewing control may be a playback control 1301 shown in FIG. 13. In addition, the resource card further includes text introduction information of the first media resource. The text introduction information may include region introduction information and resource introduction information. The region introduction information is configured for introducing the first region, and the resource introduction information is configured for introducing the first media resource. By displaying a featured video or a text description in the resource card, users may be attracted to play the first media resource corresponding to the resource card. In the above process, the user may randomly extract a resource card through a shaking function, and a media resource corresponding to a region is displayed in the resource card to guide the user to view the media resource, thereby increasing the diversity of human-computer interaction.

Figure 14A:
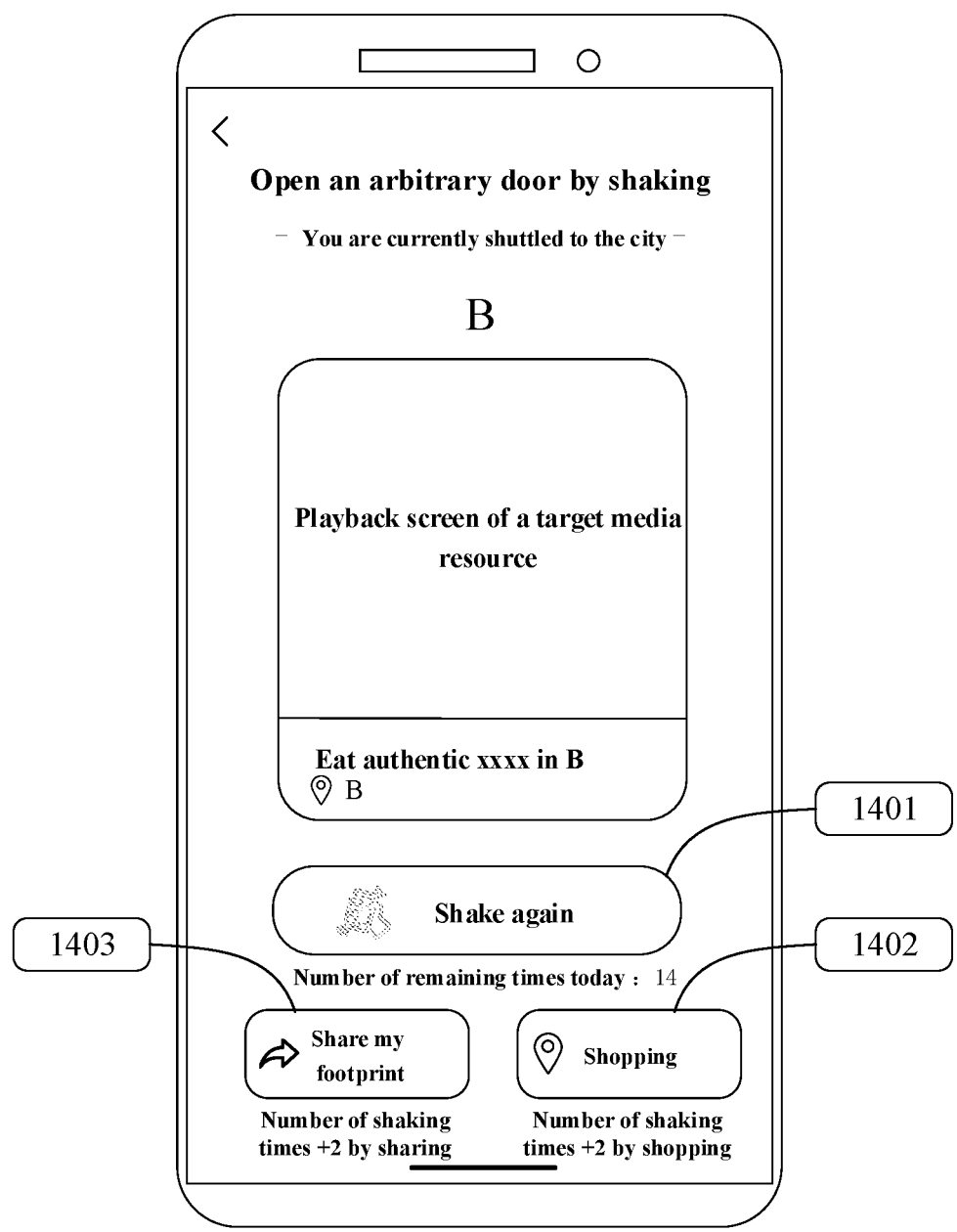
FIG. 14A is a schematic diagram of details of a resource card according to an exemplary embodiment.
Figure 14B:
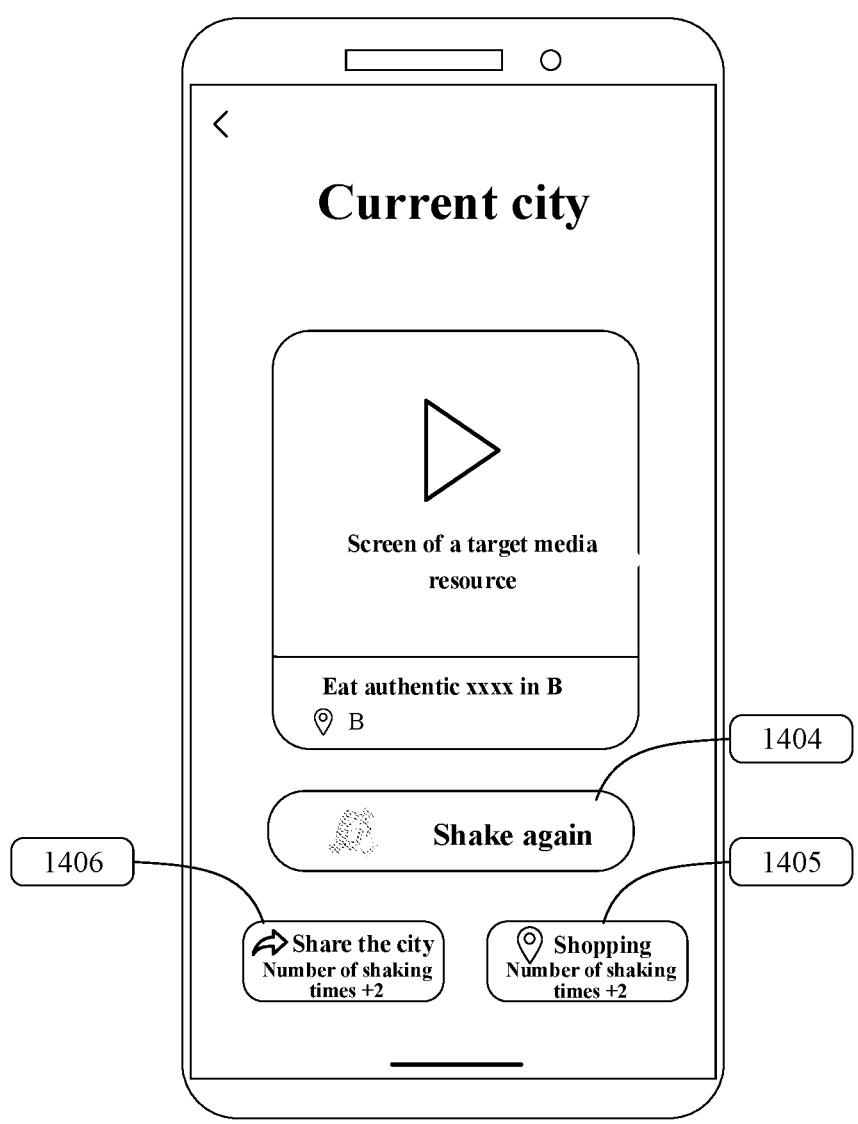
FIG. 14B is a schematic diagram of details of a resource card according to another exemplary embodiment.

In some embodiments, when displaying the resource card, the terminal displays a view-details control. The view-details control is configured to trigger a display of details of the first media resource. Referring to FIG. 13, the view-details control may be the go-to-view control 1302 shown in FIG. 13. When the user wants to view the details of the first media resource, he/she may perform a click operation on the view-details control in the resource card; then the terminal displays the details of the first media resource in the activity page in response to an operation of clicking the view-details control. For example, subsequent to FIG. 13, after clicking the go-to-view control 1302 in FIG. 13, a schematic diagram of details of the first media resource may be seen in FIG. 14A or FIG. 14B. FIG. 14A is a schematic diagram of details of a resource card according to an exemplary embodiment, and FIG. 14B is a schematic diagram of details of another resource card according to an exemplary embodiment. At this time, the terminal starts to automatically play the first media resource, and displays introduction information of the first media resource.

Figure 15:
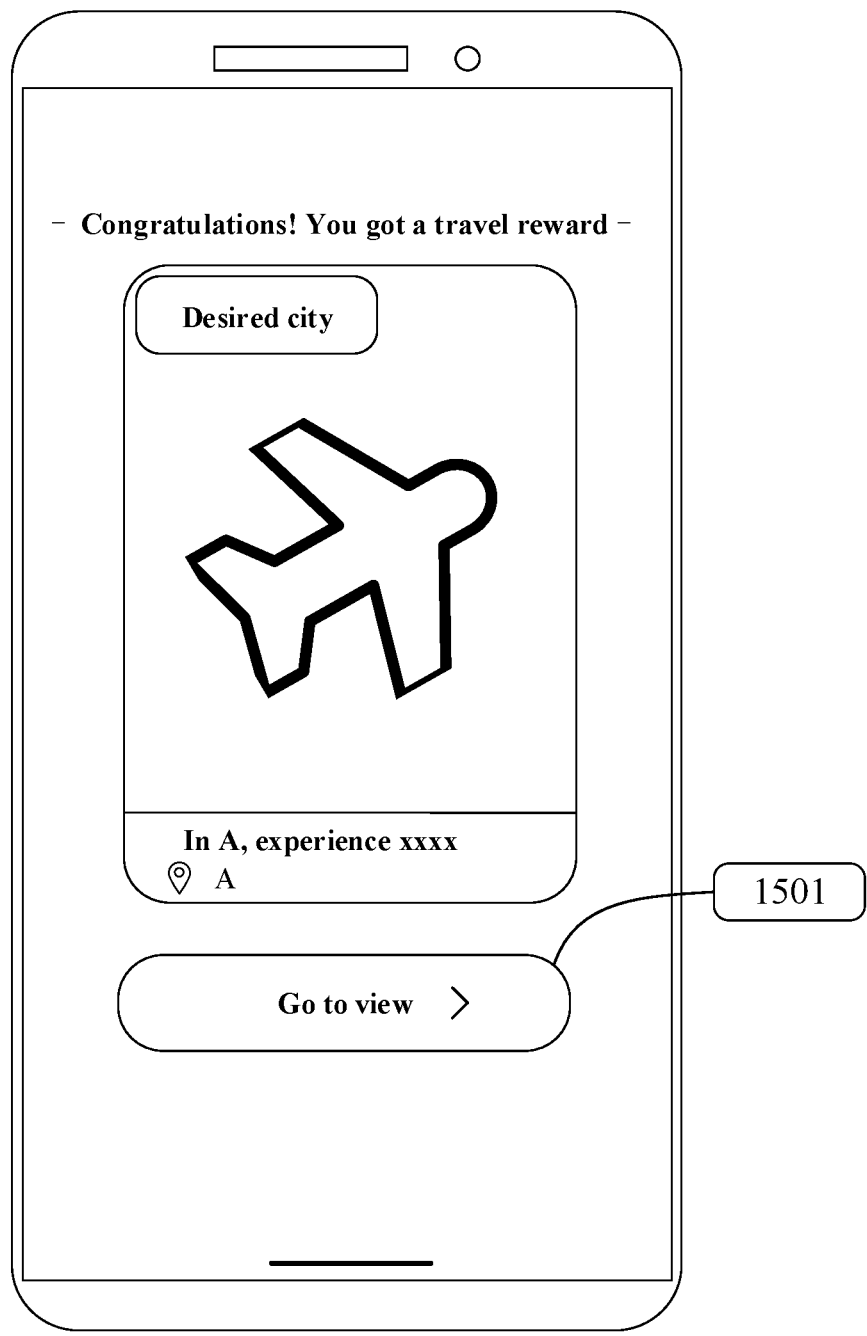
FIG. 15 is a schematic diagram of displaying a resource card according to another exemplary embodiment.

It should be noted that, the above process is a process for displaying a first media resource. In other embodiments, if the first region is a target region (desired city) that has been set by the user account, the terminal displays a corresponding bonus special effect when displaying the first media resource. In some embodiments, if the first region is the target region set by the user account logged in with the terminal, the terminal displays a first special effect in the activity page. Optionally, if the first region is the target region set by the terminal, the terminal displays the first special effect on the resource card while popping up the resource card in the activity page. For example, taking a fact that the desired city is A as an example, and when the first region is A, a schematic diagram of displaying the first special effect may be seen in FIG. 15. FIG. 15 is another schematic diagram of displaying a resource card according to an exemplary embodiment. A dynamic effect image for a reward, such as a special effect of an airplane, is displayed in the resource card while displaying the resource card. In addition, in the resource card shown in FIG. 15, prompt information for a prompt of an acquired reward, a desired-city tag, and a go-to-view control 1501 are further displayed, such as prompt information of "Congratulations! You got a travel reward".

Figure 16:
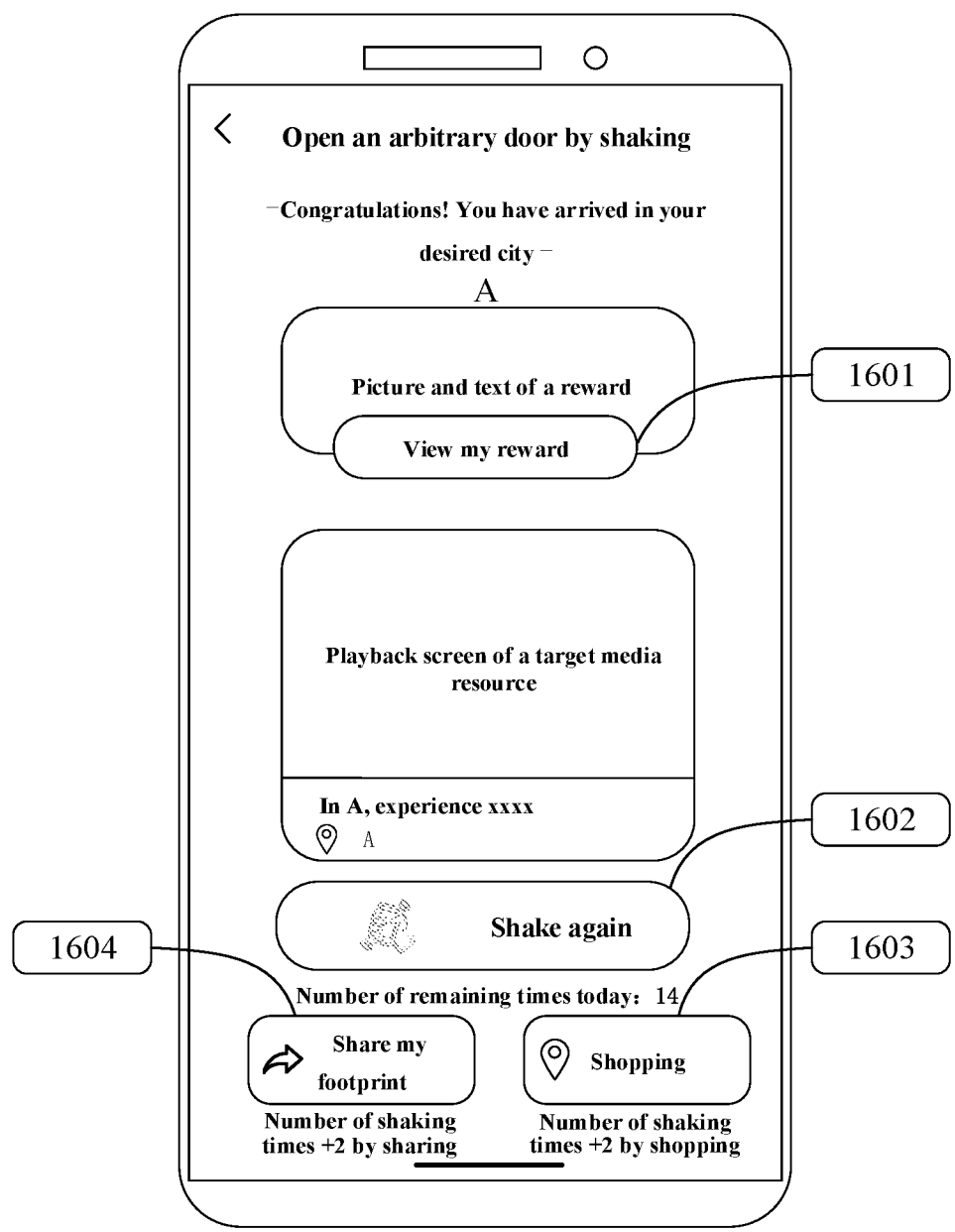
FIG. 16 is a schematic diagram of details of a resource card according to still another exemplary embodiment.

When the user wants to view the details of the first media resource, he/she performs a click operation on the go-to-view control 1501 in the resource card; then the terminal displays resource prompt information in the activity page in response to the operation of viewing the first media resource, wherein the resource prompt information is configured to provide a prompt of resources acquired by the user account. The resources acquired by the user account refer to the reward resources issued to the user account, and the reward resources are, for example, coupons or virtual gold coins. Optionally, in the activity page, the first media resource is automatically played by the terminal, and the text introduction information of the first media resource is displayed by the terminal. For example, subsequent to FIG. 15, after clicking the go-to-view control 1501 in FIG. 15, a schematic diagram of details of the first media resource may be seen in FIG. 16. FIG. 16 is a schematic diagram of details of still another resource card according to an exemplary embodiment. At this time, the terminal starts to automatically play the first media resource, and displays reward prompt information, a view-my-reward control 1601, and introduction information of the first media resource, wherein the reward prompt information may include reward pictures and reward texts, and the view-my-reward control 1601 is configured to trigger a display of a reward record of the user account. The reward record of the user account is configured to record the reward resources acquired by the user account.

In the above process, by setting a desired city and adding a corresponding reward for the desired city, rewards are added for the user when the pop-up resource card is a resource card corresponding to the desired city, which can improve an interest of activities and attract users to participate in activities. That is, when the first region is the target region set by the user account, the corresponding reward resources is issued for the user account.

Figure 17:
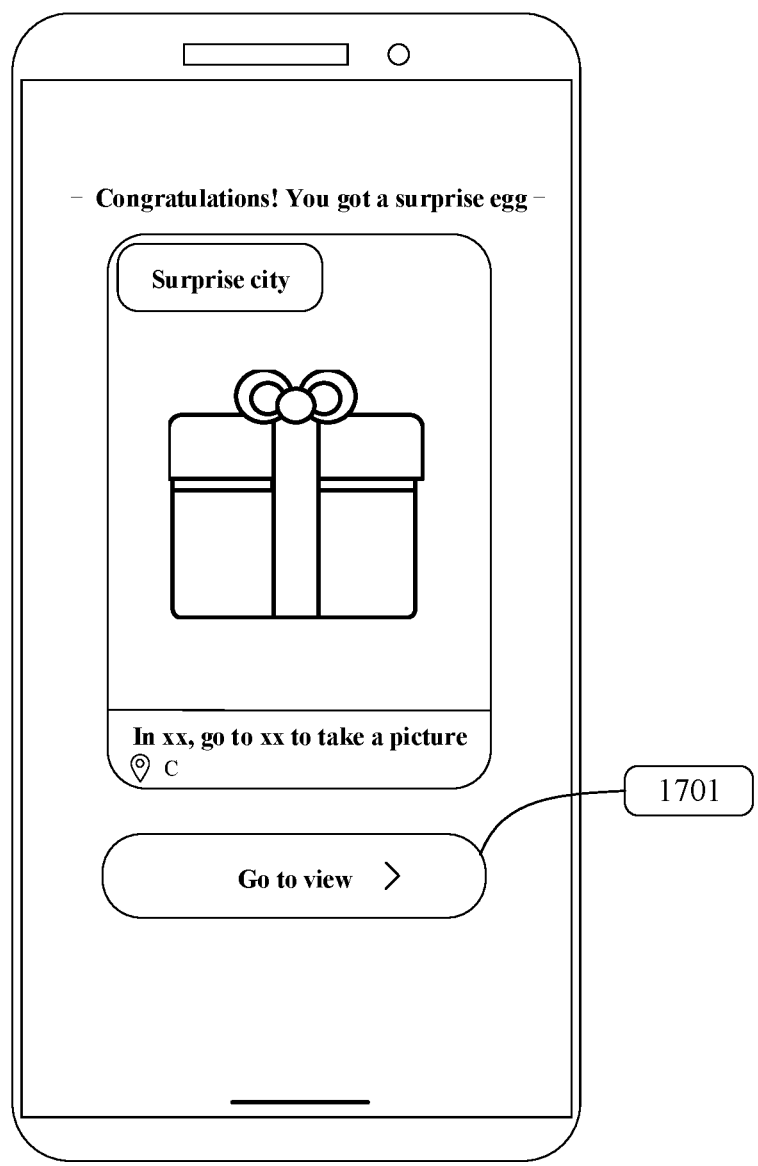
FIG. 17 is a schematic diagram of displaying a resource card according to still another exemplary embodiment.

It should be further noted that, in the embodiments of the present disclosure, the server is provided with a target region setting function, that is, the server may preset the target region. In subsequent examples, a region set by the server is represented by an Easter egg city or a surprise city. In some embodiments, if the first region is a target region set by the server, a second special effect is displayed in the activity page. Optionally, if the first region is a region set by the server, the terminal displays the second special effect in a resource card while popping up the resource card in the activity page. For example, taking a fact that the surprise city is C as an example, and when the first region is C, a schematic diagram of displaying the second effect may be seen in FIG. 17. FIG. 17 is still another schematic diagram of displaying a resource card according to an exemplary embodiment. A dynamic effect image for a reward, such as a special effect of a gift, is displayed in the resource card while displaying the resource card. In addition, in the resource card shown in FIG. 17, prompt information for a prompt of an acquired surprise egg, a surprise-city tag, and a go-to-view control 1701 are further displayed, such as prompt information of "Congratulations! You got a surprise egg".

When the user wants to view the details of the first media resource, he/she performs a click operation on the go-to-view control 1701 in the resource card; then the terminal detects this viewing operation on the first media resource, displays in the activity page resource prompt information configured to provide a prompt of resources acquired by the user account, and play in the activity page the first media resource while displaying introduction information of the first media resource. That is, when the first region is the target region set by the server, the corresponding reward resources is issued for the user account.

A method for displaying media resources usually includes: displaying, by a multimedia application, media resources of a city that match positioning information of a user's terminal to the user based on the positioning information. When the user wants to view a media resources of another city, he/she may manually select a desired city from a number of city options contained in an interface of a multimedia application, such that media resources of the selected city is displayed in the interface of the multimedia application.

In the above technical solution, the media resources of different cities need to be manually selected, and thus it is impossible to quickly view the media resources of different cities, which reduces human-computer interaction efficiency.

In technical solutions according to embodiments of the present disclosure, when a target event is detected based on an activity page, an operation of displaying a media resource corresponding to a region can be triggered. In this way, a media resource of any region can be displayed by performing an operation corresponding to the target event, and media resources of different regions can be viewed without manual selection, thereby improving human-computer interaction efficiency. In addition, the first media resource corresponding to the first region is displayed in the form of a resource card, so as to improve an interest and diversity in displaying media resources and attract more users to participate in activities.

In foregoing embodiments, a process of displaying media resources is described. In addition, after displaying the first media resource of the first region by the terminal, other implementing modes are possible for achieving different business requirements. The following describes the technical solutions according to five embodiments:

In a first embodiment, the terminal displays a fifth control in the activity page, and the fifth control is configured to trigger a display of a media resource corresponding to a region. A second media resource corresponding to a second region is acquired in response to a trigger operation on the fifth control in the activity page, wherein the second region is different from the first region; and the second media resource corresponding to the second region is displayed in the activity page.

For example, referring to FIG. 14A, FIG. 14B or FIG. 16, the fifth control may be a shake-again control 1401 in FIG. 14A, or a shake-again control 1404 in FIG. 14B, or a shake-again control 1602 in FIG. 16. In this embodiment, a process of acquiring and displaying a resource card may be performed by triggering the fifth control, such that a process of acquiring and displaying media resources again may be quickly implemented, thereby improving the user's activity experience and improving the efficiency of switching displayed media resources.

The foregoing embodiment is a process of directly acquiring media resources by clicking the fifth control. In other embodiments, in response to detecting a trigger operation on the fifth control, an operation of jumping to the first page is performed, and a display of the activity page and the second media resource corresponding to the second region is triggered based on the first page acquired after the jumping. In this embodiment, the operation of jumping to the first page is performed based on a trigger operation on the fifth control, and the activity entry is displayed in the first page. In this way, the user performs a click operation on the activity entry so as to trigger a process of acquiring and displaying a resource card performed by the terminal.

In a second embodiment, when detecting the target event again based on the activity page, the terminal acquires a second media resource corresponding to a second region; and displays the second media resource corresponding to the second region in the activity page.

In this embodiment, a display of the second media resource can be achieved by an operation of shaking the activity page again, thereby improving the user's activity experience and improving the efficiency of switching displayed media resources. For example, the activity page includes the fifth control, the target event is a trigger operation on the fifth control.

In a third embodiment, when the target event is detected based on a second page, the terminal acquires a second media resource corresponding to a second region, the first page is a page associated with the activity page, and the terminal displays the second media resource in the activity page.

For example, the first page is an intra-city page, or Home page, or a page containing a resource card, or an intra-city page displayed again.

In some embodiments, the target event is the trigger operation on the fifth control in the first page. The terminal displays the fifth control in the first page, acquires the second media resource corresponding to the second region in response to a trigger operation on the fifth control in the first page, and displays the second media resource in the activity page. In this embodiment, the shake-again control may further be displayed in other pages. In this way, a display of the second media resource corresponding to the second region can be achieved by a click operation on the shake-again control in any page by the user, which facilitates the user's operation and better attracts users to participate in activities, further improving the efficiency of human-computer interaction.

In other embodiments, the target event may also be other type of events, for example, an operation of shaking the terminal, an operation of clicking a target region in the first page or an operation of receiving an audio instruction carrying a keyword, etc. when detecting the target event based on the first page, the terminal acquires a second media resource corresponding to the second region, and displays the second media resource in the activity page. In this embodiment, a shaking operation may further be performed on other pages. In this way, a display of the media resource can be achieved by a shaking operation on any page by the user, which facilitates the user's operation and better attracts users to participate in activities, further improving the efficiency of human-computer interaction.

In a fourth embodiment, the terminal displays in the activity page a first control configured to trigger a display of media resources with location tags of the same region as that of the first media resource, and displays in the second page the media resources with location tags of the same region as that of the first media resource in response to a trigger operation on the first control.

That is, the terminal displays multiple other media resources corresponding to the first region in the second page in response to the trigger operation on the first control, wherein the second page is used to display multiple media resources corresponding to the same region. The location tag of the first media resource belongs to the first area, and the terminal, in responds to the trigger operation on the first control, displays the multiple other media resources with the location tags belonging to the first area in the second page.

Figure 18:
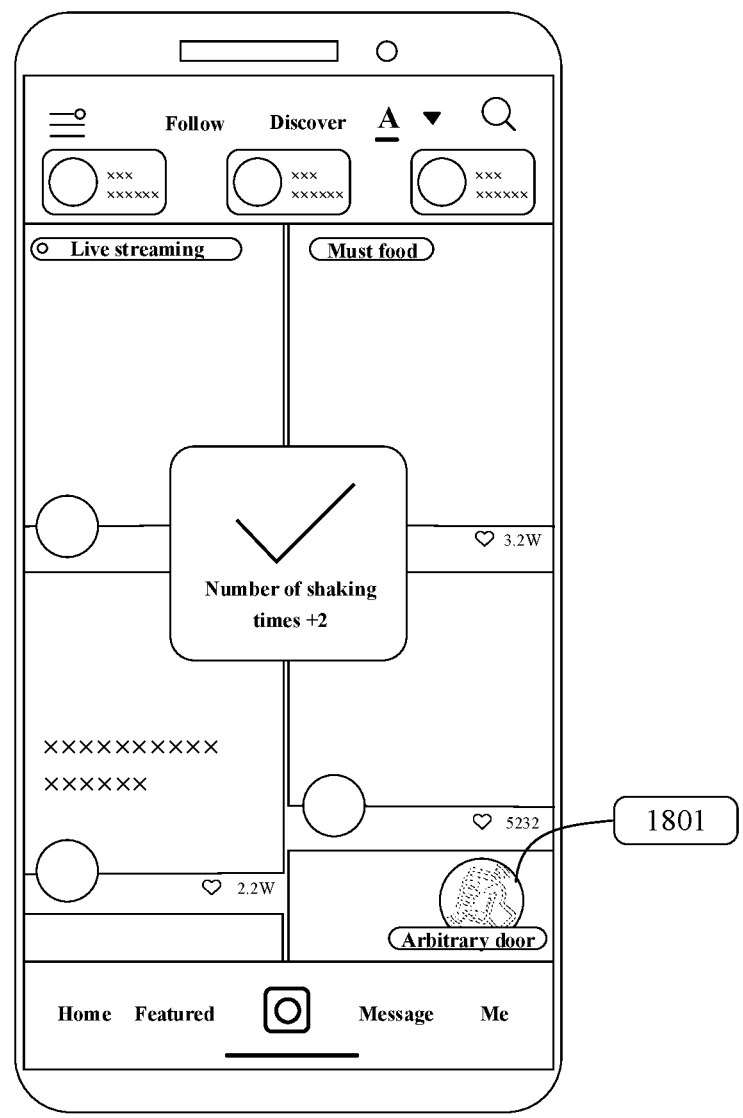
FIG. 18 is a schematic diagram of a first page according to an exemplary embodiment.

For example, referring to FIG. 14A, FIG. 14B or FIG. 16, the first control is a shopping control 1402 in FIG. 14A, or a shopping control 1405 in FIG. 14B, or a shopping control 1603 in FIG. 16. In response to a trigger operation on the first control, the terminal displays media resources with location tags of the same region as that of the first media resource in the second page which is configured to display multiple media resources with location tags of the same region. For example, subsequent to FIG. 14A, when a click operation is performed on the shopping control 1402 shown in FIG. 14A, a second page of a region A is displayed. A schematic diagram of the second page of the region A may be seen in FIG. 18. FIG. 18 is a schematic diagram of a second page according to an exemplary embodiment, and multiple media resources with location tags of A are displayed in the second page of the region A. In addition, the terminal further displays the activity entry in the form of a widget in the second page of the region A, that is, an arbitrary door widget 1801 in FIG. 18. Furthermore, after the terminal responds to the trigger operation on the first control, the terminal increases the number of remaining acquisition times of the user account, and displays prompt information of the increased number of times in the second page, such as prompt information of the increased number of shaking times +2 as shown in FIG. 18.

In a fifth embodiment, the terminal displays in the activity page a second control configured to trigger an operation of sharing the first media resource, and shares the first media resource to a target object in response to the trigger operation on the third control.

Figure 19:
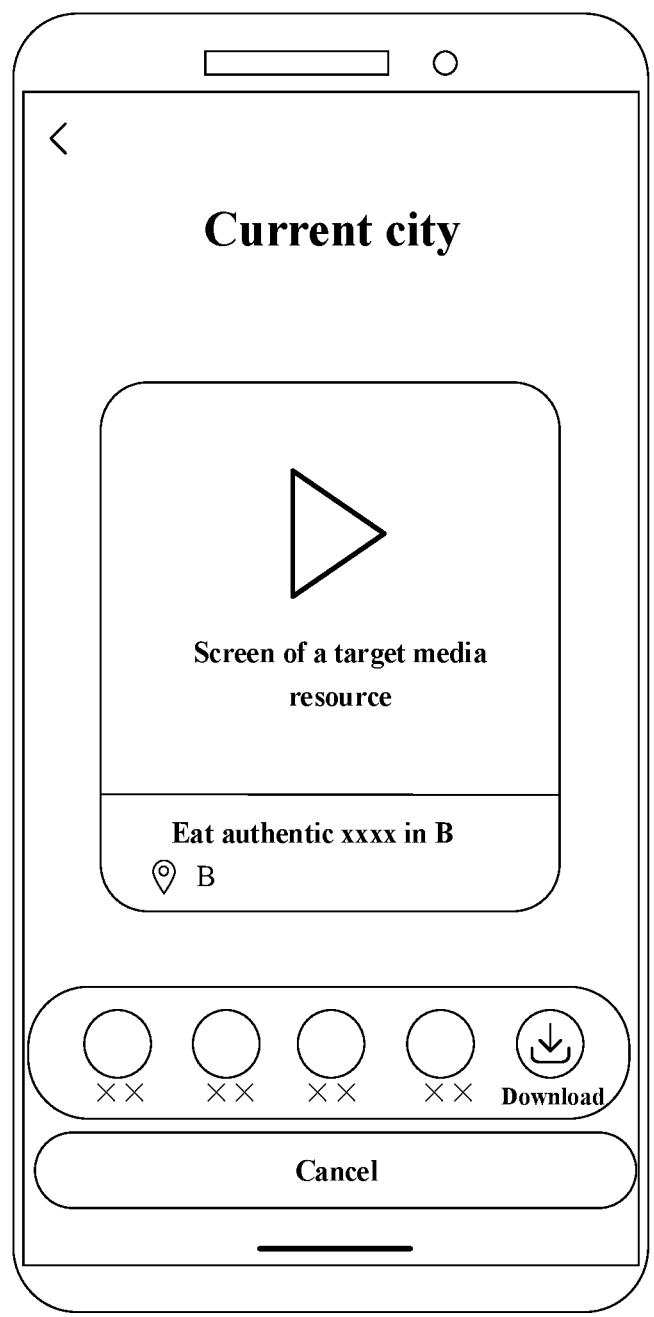
FIG. 19 is a schematic diagram of a sharing page according to another exemplary embodiment.

For example, referring to FIG. 14B, the second control may be a share-the-city control 1406 in FIG. 14B. In response to a trigger operation on the second control, the terminal shares the first media resource to the target object. Subsequent to FIG. 14B, when the user performs a click operation on the share-the-city control 1406 in FIG. 14B, the terminal displays a sharing page as shown in FIG. 19 in response to the click operation on the share-the-city control 1406. FIG. 19 is a schematic diagram of a sharing page according to an exemplary embodiment, and the sharing page includes a resource card containing the first media resource, icon controls of multiple social applications, and download controls. In this embodiment, it is possible to share the first media resource.

In other embodiments, the terminal displays in the activity page a sixth control configured to trigger an operation of sharing media resources that have been displayed for the user account logged in with the terminal, and shares the media resources that have been displayed to the target object in response to a trigger operation on the sixth control is detected. For example, the sixth control is a share-my-footprint control 1403 in FIG. 14A or a share-my-footprint control 1604 in FIG. 16. In this embodiment, it is possible to share media resources that have been displayed.

Figure 20:
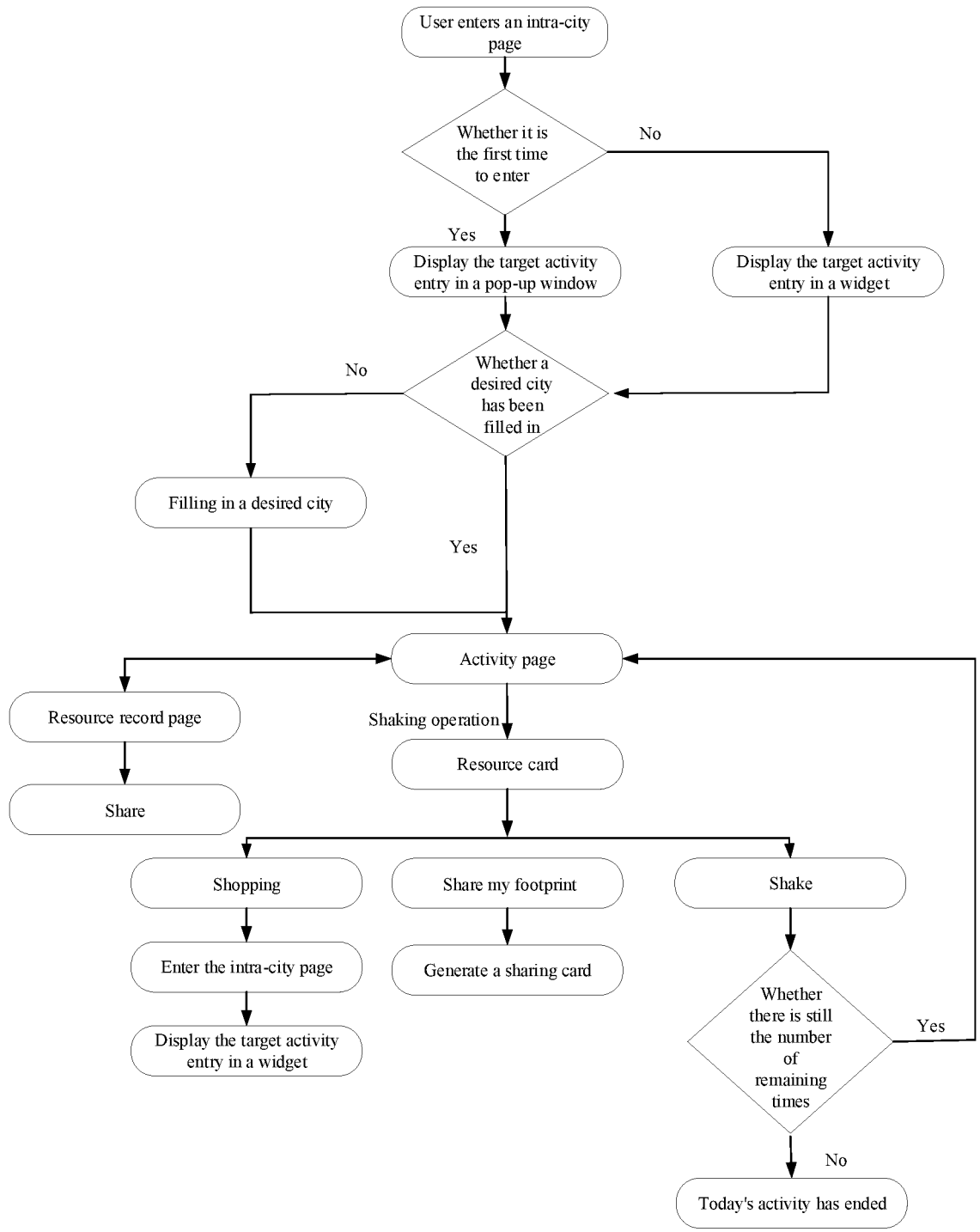
FIG. 20 is a flowchart of displaying media resources according to an exemplary embodiment.

For ease of understanding, the technical solutions are described with a specific example below. For example, FIG. 20 is a flowchart of displaying media resources according to an exemplary embodiment. Referring to FIG. 20, when a user enters the intra-city page, it is determined whether it is the first time for the user to enter the page, if yes, the activity entry is displayed in a pop-up window; or if not, the activity entry is displayed in a widget. If the user clicks the activity entry, a process of determining whether a desired city has been filled in is triggered, if yes, the activity page (i.e., a page for shaking) is displayed; and if not, a process of filling in a desired city is performed. If the user performs a shaking (or other interaction) operation, a resource card is triggered to be popped up. After the resource card is popped up, the activity page displays controls such as a shopping control, a share-my-footprint control, and a shake-again control. By the shopping control, the user may enter a second page appeared upon shaking, and the second page displays media resources of the city appeared upon shaking. By the share-my-footprint control, the user may share my-footprint information in the form of sharing cards to attract more users to participate in activities. The user may participate in the shaking activity in the activity page again by the shake-again control. It should be noted that, after clicking the shake-again control, a process of determining whether the state identification is still valid is triggered, if yes, an operation of jumping to the activity page is performed; and if not, the user is prompted that today's activity has ended. In addition, through the view-my-footprint-achievement control in the activity page, a process of displaying the resource record page of the user account may be triggered, and the fourth control is also displayed in the resource record page, so as to realize sharing of resource records of the user account.

In technical solutions according to embodiments of the present disclosure, when a target event is detected based on an activity page, an operation of displaying a media resource corresponding to a region can be triggered. In this way, a media resource of any region can be displayed by performing an operation corresponding to the target event, and media resources of different regions can be viewed without manual selection, thereby improving human-computer interaction efficiency. In addition, the first media resource corresponding to the first region is displayed in the form of a resource card, so as to improve an interest in displaying media resources and attract more users to participate in activities. Furthermore, by displaying trigger controls with different functions in the activity page, different types of service needs can be met, so as to attract more users to participate in activities while improving users' experience.

Figure 21:
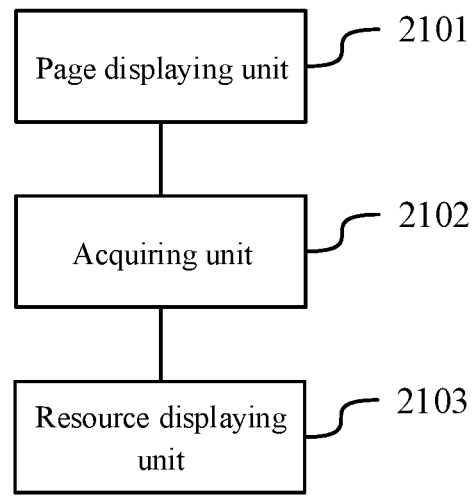
FIG. 21 is a block diagram of an apparatus for displaying media resources according to an exemplary embodiment.

FIG. 21 is a block diagram of an apparatus for displaying media resources according to an exemplary embodiment. Referring to FIG. 21, the apparatus includes a page displaying unit 2101, an acquiring unit 2102 and a resource displaying unit 2103.

The page displaying unit 2101 is configured to display an activity page, wherein the activity page is configured to trigger a display of a media resource corresponding to a region.

The acquiring unit 2102 is configured to acquire a first media resource corresponding to a first region in response to detecting a target event based on the activity page, wherein the first media resource is configured to recommend the first region.

The resource displaying unit 2103 is configured to display the first media resource in the activity page.

In some embodiments, the acquiring unit 2102 is further configured to acquire a second media resource corresponding to a second region in response to detecting the target event again based on the activity page, wherein the second region is different from the first region; and the resource displaying unit 2103 is further configured to display the second media resource in the activity page.

In some embodiments, the acquiring unit 2102 is further configured to acquire a second media resource corresponding to a second region in response to detecting the target event based on the first page, wherein the first page is a page associated with the activity page; and the resource displaying unit 2103 is further configured to display the second media resource in the activity page.

In some embodiments, the activity page includes a first control, the resource displaying unit 2103 is further configured to display multiple other media resources corresponding to the first region in a second page in response to a trigger operation on the first control.

In some embodiments, a location tag of the first media resource belongs to the first region, and the resource displaying unit 2103 is further configured to display, in the second page, the multiple other media resources with location tags belonging to the first region.

In some embodiments, the activity page includes a second control, and the apparatus further includes any one of the follows:

a second control displaying unit configured to share the first media resource to a target object in response to a trigger operation on the second control.

In some embodiments, the apparatus further includes any one of the follows:

an entry displaying unit configured to display an activity entry in a first page, wherein the first page is a page associated with the activity page; and display the activity page in response to a trigger operation on the activity entry.

In some embodiments, the entry displaying unit is configured to perform any one of the follows:

displaying the activity entry in the first page in a form of a pop-up window in response to displaying the first page for the first time for a terminal with a user account logged in; or displaying the activity entry in the first page in the form of a widget in response to displaying the first page not for the first time for the terminal with the user account logged in.

In some embodiments, the activity page includes a third control, and the apparatus further includes:

the resource displaying unit 2103 is further configured to display a resource record page in response to a trigger operation on the third control, wherein the resource record page includes media resources that have been displayed for a user account logged in with a terminal.

In some embodiments, the resource displaying unit 2103 is further configured to display a fourth control in the resource record page, wherein the fourth control is configured to trigger an operation of sharing the media resources that have been displayed for the user account.

In some embodiments, the apparatus further includes:

a first special effect displaying unit configured to display a first special effect in the activity page in response to the first region being a target region set by the user account logged in with the terminal; or a second special effect displaying unit configured to display a second special effect in the activity page in response to the first region being a target region set by a server.

In some embodiments, the apparatus further includes:

a prompt information displaying unit configured to display resource prompt information in the activity page in response to an operation of viewing the first media resource, wherein the resource prompt information is configured to prompt resources acquired by the user account.

In some embodiments, the page displaying unit 2101 is further configured to perform any one of the follows:

displaying the activity page in response to the target region having been set by a user account; and displaying a region filling page in response to no target region having been set by the user account, wherein the region filling page is configured to set the target region by the user account.

In some embodiments, the target event includes one of the follows: an operation of shaking the terminal, an operation of clicking a target region in the activity page, a trigger operation on controls in the activity page and an operation of receiving an audio instruction carrying a keyword.

In some embodiments, the resource displaying unit 2103 is configured to display a resource card in the activity page, wherein the first media resource is displayed in the resource card.

In technical solutions according to embodiments of the present disclosure, when a target event is detected based on an activity page, an operation of displaying a media resource corresponding to a region can be triggered. In this way, a media resource of any region can be displayed by performing an operation corresponding to the target event, and media resources of different regions can be viewed without manual selection, thereby improving human-computer interaction efficiency.

It should be noted that, a display of media resources by the apparatus for displaying media resources according to the foregoing embodiments is illustrated by taking a division mode of the foregoing functional modules as an example. In practice, the foregoing functions may be assigned to different functional modules as required, that is, an internal structure of the apparatus may be divided into different function modules to complete all or part of functions described above. In addition, since the apparatus for displaying media resources according to above-described embodiments belongs to the same concept as that of above embodiments of the method for displaying media resources, the latter may be referred to for a specific implementing process of the apparatus, which is not repeated here.

Figure 22:
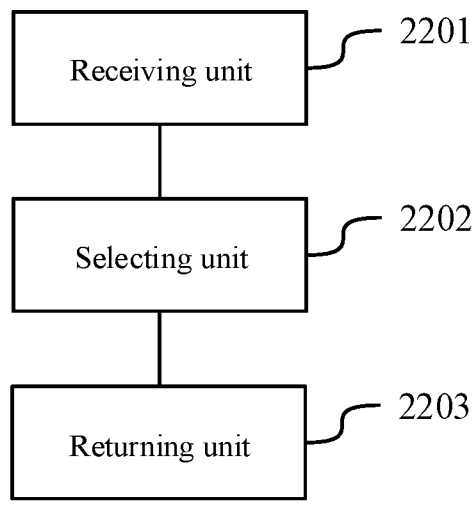
FIG. 22 is a block diagram of an apparatus for displaying media resources according to an exemplary embodiment.

FIG. 22 is a block diagram of an apparatus for displaying media resources according to an exemplary embodiment. Referring to FIG. 22, the apparatus includes a receiving unit 2201, a selecting unit 2202 and a returning unit 2203.

The receiving unit 2201 is configured to receive a request for media resource acquisition transmitted by a terminal based on an activity page, wherein the activity page is configured to trigger a display of a media resource corresponding to a region.

The selecting unit 2202 is configured to select a first media resource corresponding to a first region from multiple media resources; and The returning unit 2203 is configured to return resource information of the first media resource and the first region to the terminal.

In some embodiments, the selecting unit 2202 is further configured to acquire a state identification of a user account logged in with the terminal, wherein the state identification is configured to indicate that the user account has a permission for acquiring media resources; and select the first media resource in response to the state identification being valid.

In some embodiments, the apparatus further includes:

a transmitting unit configured to transmit state prompt information to the terminal in response to the state identification being invalid, wherein the state prompt information is configured to prompt that the user account does not have the permission for acquiring the media resource.

In technical solutions according to embodiments of the present disclosure, when a target event is detected based on an activity page, an operation of displaying a media resource corresponding to a region can be triggered. In this way, a media resource of any region can be displayed by performing an operation corresponding to the target event, and media resources of different regions can be viewed without manual selection, thereby improving human-computer interaction efficiency.

It should be noted that, a display of media resources by the apparatus for displaying media resources according to the foregoing embodiments is illustrated by taking a division mode of the foregoing functional modules as an example. In practice, the foregoing functions may be assigned to different functional modules as required, that is, an internal structure of the apparatus may be divided into different function modules to complete all or part of functions described above. In addition, since the apparatus for displaying media resources according to above-described embodiments belongs to the same concept as that of above embodiments of the method for displaying media resources, the latter may be referred to for a specific implementing process of the apparatus, which is not repeated here.

Figure 23:
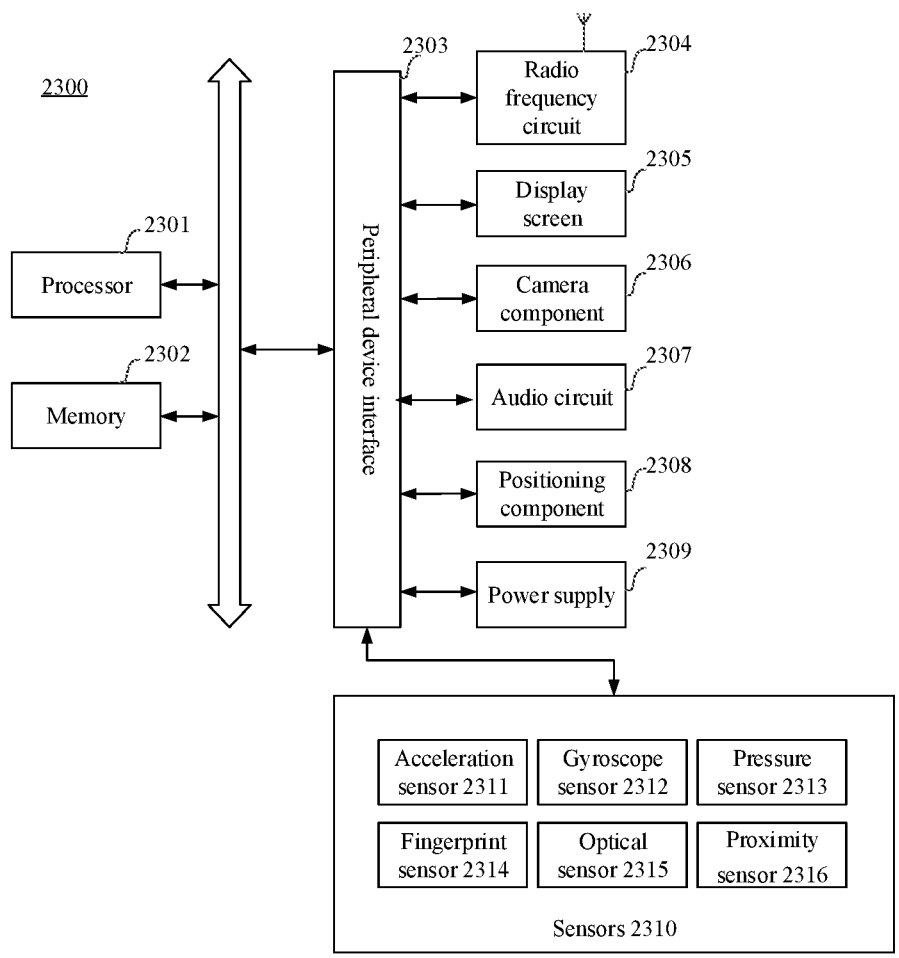
FIG. 23 is a structural block diagram of a terminal according to an exemplary embodiment.

FIG. 23 is a structural block diagram of a terminal according to an exemplary embodiment. The terminal 2300 may be: smart phones, tablet computers, moving picture experts group audio layer III (MP3) players, moving picture experts group audio layer IV (MP4) players, laptop or desktop computers. The terminal 2300 may also be referred to with other names such as user equipment, a portable terminal, a laptop terminal, a desktop terminal.

Generally, the terminal 2300 includes: a processor 2301 and a memory 2302.

The processor 2301 may include one or more processing cores, such as a quad-core processor, an eight-core processor. The processor 2301 may be implemented in at least one hardware form of digital signal processing (DSP), a field-programmable gate array (FPGA), programmable logic array, and a programmable logic array (PLA). The processor 2301 may also include a main processor and a co-processor. The main processor is a processor configured to process data in an awake state, and is also called a central processing unit (CPU); and the co-processor is a low-power processor configured to process data in a standby state. In some embodiments, the processor 2301 may be integrated with a graphics processing unit (GPU), and the GPU is configured for rendering and drawing of contents to be displayed by a display screen. In some embodiments, the processor 2301 may further include an artificial intelligence (AI) processor, and the AI processor is configured for processing operations related to machine learning.

The memory 2302 may include one or more non-transitory computer-readable storage medium, and the non-transitory computer-readable storage medium may be non-transitory. The memory 2302 may further include a high-speed random-access memory, and a nonvolatile memory, such as one or more magnetic disk storage devices, flash storage device. In some embodiments, a non-transitory computer-readable storage medium in the memory 2302 is configured for storing at least one instruction, and the at least one instruction is configured to be executed by the processor 2301 to implement the method for displaying media resources according to embodiments of the present disclosure.

In some embodiments, the terminal 2300 may further optionally include: a peripheral device interface 2303 and at least one peripheral device. The processor 2301, the memory 2302 and the peripheral device interface 2303 may be connected by a bus or a signal line. Each peripheral device may be connected to the peripheral device interface 2303 through a bus, a signal line or a circuit board. Specifically, the peripheral device includes: at least one of a radio frequency circuit 2304, a display screen 2305, a camera component 2306, an audio circuit 2307, a positioning component 2308, and a power supply 2309.

The peripheral interface 2303 may be configured to connect at least one peripheral device with associated I/O (Input/Output) to the processor 2301 and the memory 2302. In some embodiments, the processor 2301, the memory 2302 and the peripheral device interface 2303 are integrated on the same chip or circuit board; in some other embodiments, any one or two of the processor 2301, the memory 2302 and the peripheral device interface 2303 may be implemented on a separate chip or circuit board, which is not limited in this embodiment.

The radio frequency circuit 2304 is configured to receive and transmit radio frequency (RF) signals, which are also called electromagnetic signals. The radio frequency circuit 2304 communicates by means of electromagnetic signals with a communication network and other communication devices. The radio frequency circuit 2304 converts electric signals to electromagnetic signals for transmission, or converts received electromagnetic signals to electrical signals. Optionally, the radio frequency circuit 2304 includes: an antenna system, an RF transceiver, one or more amplifiers, a tuner, an oscillator, a digital signal processor, a coding-decoding chipset, a subscriber identity module card or the like. The radio frequency circuit 2304 may communicate with other terminals via at least one wireless communication protocol. The wireless communication protocols include, but are not limited to: Metropolitan Area Network (MAN), generations of mobile communication channel networks (2G, 3G, 4G and 5G), wireless local area network (WLAN) and/or a wireless fidelity (WiFi) network. In some embodiments, the radio frequency circuit 2304 may further include a circuit related to near field communication (NFC), which is not limited in the present disclosure.

The display screen 2305 is configured to display a user interface (UI). The UI may include graphics, texts, icons, videos, and any combination thereof. When the display screen 2305 is a touch screen, the display screen 2305 further has a function of acquiring a touch signal on a surface of the display screen 2305 or above the surface. The touch signal may be input as a control signal to the processor 2301 for processing. At this time, the display screen 2305 may also serve to provide virtual buttons and/or virtual keyboards, which are also called soft buttons and/or soft keyboards. In some embodiments, the display screen 2305 may be provided as one screen disposed at a front panel of the terminal 2300; in other embodiments, the display screen 2305 may be provided as at least two screens disposed on different surfaces of the terminal 2300, or designed as folded; in other embodiments, the display screen 2305 may be a flexible display screen disposed on a curved surface or a folded surface of the terminal 2300. Furthermore, the display screen 2305 may also be provided as a non-rectangular irregular pattern, that is, a special-shaped screen. The display screen 2305 may be prepared with a liquid crystal display (LCD), an organic light-emitting diode (OLED) and other materials.

The camera component 2306 is configured to capture images or videos. Optionally, the camera component 2306 includes a front camera and a rear camera. Generally, the front camera is disposed on the front panel of the terminal, and the rear camera is disposed on a back surface of the terminal. In some embodiments, there are at least two rear cameras, i.e., a main camera, a field-depth camera, a wide-angle camera, and a telephoto camera, so as to realize a background blur function by combining the main camera and the field-depth camera, a panoramic shooting function and a virtual reality (VR) shooting function by combining the main camera and the wide-angle camera, or other fusion shooting functions. In some embodiments, the camera component 2306 may further include a flashlight. The flashlight may be a single-color-temperature flashlight or a dual-color-temperature flashlight. The dual-color-temperature flashlight refers to a combination of a warm flashlight and a cold flashlight, which may provide light compensation for different color temperatures.

The audio circuit 2307 may include a microphone and a speaker. The microphone is configured to acquire sound waves of the user and an environment, convert the sound waves into electrical signals, and input the electrical signals to the processor 2301 for processing, or input the electrical signals to the radio frequency circuit 2304 to realize voice communication. For the purpose of stereo acquisition or noise reduction, multiple microphones may be provided and disposed at different parts of the terminal 2300 respectively. The microphone may be an array microphone or an omni-directional acquisition microphone. The speaker is configured to convert the electrical signals from the processor 2301 or the radio frequency circuit 2304 into sound waves. The speaker may be a traditional thin-film speaker or a piezoelectric ceramic speaker. When the speaker is a piezoelectric ceramic speaker, it may not only convert electrical signals into sound waves that are audible to humans, but also convert electrical signals into sound waves that are inaudible to humans for distance measurement and other purposes. In some embodiments, the audio circuitry 2307 may further include a headphone jack.

The positioning component 2308 is configured to determine a current geographical position of the terminal 2300 for providing a navigation or location based service (LBS). The positioning component 2308 may be the United States' Global Positioning System (GPS), Russia's Global Navigation Satellite System (GLONASS), China's BeiDou Navigation Satellite System (BDS), and the European Union's Galileo.

The power supply 2309 is configured to supply power for various components in the terminal 2300. The power supply 2309 may be AC, DC, disposable batteries or rechargeable batteries. When the power supply 2309 includes a rechargeable battery, the rechargeable battery may be charged in a wired mode or a wireless mode. The rechargeable battery may also support the fast-charging technology.

In some embodiments, the terminal 2300 further includes one or more sensors 2310. The one or more sensors 2310 include, but are not limited to: an acceleration sensor 2311, a gyroscope sensor 2312, a pressure sensor 2313, a fingerprint sensor 2314, an optical sensor 2315 and a proximity sensor 2316.

The acceleration sensor 2311 may detect magnitude of accelerations on three coordinate axes of a coordinate system established for the terminal 2300. For example, the acceleration sensor 2311 may be configured to detect components of gravitational acceleration in the three axes. The processor 2301 may control the display screen 2305 to display a user interface in a lateral view or a vertical view based on gravitational acceleration signals acquired by the acceleration sensor 2311. The acceleration sensor 2311 may also be configured to acquire motion data of a game or a user.

The gyroscope sensor 2312 may detect a body direction and a rotational angle of the terminal 2300. The gyroscope sensor 2312 may cooperate with the acceleration sensor 2311 to acquire the user's 3D actions on the terminal 2300. According to data acquired by the gyroscope sensor 2312, the processor 2301 may implement the following functions: motion sensing (such as changing the UI based on the user's tilt operation), image stabilization during shooting, game control, and inertial navigation.

The pressure sensor 2313 may be provided at a side frame of the terminal 2300 and/or on a layer under the display screen 2305. When the pressure sensor 2313 is provided at the side frame of the terminal 2300, a signal of holding the terminal 2300 by a user may be detected, and the processor 2301 performs left/right hand recognition or a quick operation based on the signal of holding acquired by the pressure sensor 2313. When the pressure sensor 2313 is provided on a layer under the display screen 2305, the processor 2301 controls operable controls on the UI based on the user's pressure operation on the display screen 2305. The operable controls include at least one of button controls, scroll bar controls, icon controls, and menu controls.

The fingerprint sensor 2314 is configured to acquire a user's fingerprint, and the user's identity is recognized by the processor 2301 or by the fingerprint sensor 2314 based on the acquired fingerprint by the fingerprint sensor 2314. When it is recognized that the user's identity is credible, the user is authorized by the processor 2301 to perform related sensitive operations, such as unlocking the screen, viewing encrypted information, downloading software, paying and changing settings. The fingerprint sensor 2314 may be provided at a front surface, a rear surface or a side surface of the terminal 2300. When the terminal 2300 is provided with a physical button or its manufacturer's Logo, the fingerprint sensor 2314 may be integrated with the physical button or the manufacturer's Logo.

The optical sensors 2315 is configured to acquire ambient light intensity. In one embodiment, the processor 2301 may control displaying brightness of the display screen 2305 based on the ambient light intensity acquired by the optical sensor 2315. Specifically, when the ambient light intensity is high, the displaying brightness of the display screen 2305 is increased; and when the ambient light intensity is low, the displaying brightness of the display screen 2305 is decreased. In another embodiment, the processor 2301 may also dynamically adjust imaging parameters of the camera component 2306 based on the ambient light intensity acquired by the optical sensor 2315.

The proximity sensor 2316, also known as a distance sensor, is generally provided at the front panel of the terminal 2300. The proximity sensor 2316 is configured to acquire a distance between the user and the front surface of the terminal 2300. In one embodiment, the processor 2301 controls the display screen 2305 to switch from a screen-on state to a screen-off state when the proximity sensor 2316 detects that the distance between the user and the front surface of the terminal 2300 gradually decreases; and the processor 2301 controls the display screen 2305 to switch from the screen-off state to the screen-on state when the proximity sensor 2316 detects that the distance between the user and the front surface of the terminal 2300 gradually increases.

Those skilled in the art may appreciate that, a structure shown in FIG. 23 does not constitute a limitation on the terminal 2300, and more or fewer components than those shown may be included, or some of components may be combined, or different components arrangement may be provided.

Embodiments of the present disclosure further provide a terminal, including: one or more processors; and a memory configured to store program code executable by the processor; wherein the processor, when executing the program code, is caused to perform:

displaying an activity page, wherein the activity page is configured to trigger a display of a media resource corresponding to a region;

acquiring a first media resource corresponding to a first region in response to detecting a target event based on the activity page, wherein the first media resource is configured to recommend the first region; and displaying the first media resource in the activity page.

In some embodiments, the processor, when executing the program code, is caused to perform:

acquiring a second media resource corresponding to a second region in response to detecting the target event again based on the activity page, wherein the second region is different from the first region; and displaying the second media resource in the activity page.

In some embodiments, the processor, when executing the program code, is caused to perform:

acquiring a second media resource corresponding to a second region in response to detecting the target event based on the first page, wherein the first page is a page associated with the activity page; and displaying the second media resource in the activity page.

In some embodiments, the activity page includes a first control, and the processor, when executing the program code, is caused to perform:

displaying multiple other media resources corresponding to the first region in a second page in response to a trigger operation on the first control.

In some embodiments, a location tag of the first media resource belongs to the first region, and the processor, when executing the program code, is caused to perform:

displaying, in the second page, the multiple other media resources with location tags belonging to the first region.

In some embodiments, the activity page includes a second control, and the processor, when executing the program code, is caused to perform:

sharing the first media resource to a target object in response to a trigger operation on the second control.

In some embodiments, the processor, when executing the program code, is caused to perform:

displaying an activity entry in a first page, wherein the first page is a page associated with the activity page; and displaying the activity page in response to a trigger operation on the activity entry.

In some embodiments, the processor, when executing the program code, is caused to perform:

displaying the activity entry in the first page in a form of a pop-up window in response to displaying the first page for the first time for a terminal with a user account logged in; or displaying the activity entry in the first page in the form of a widget in response to displaying the first page not for the first time for the terminal with the user account logged in.

In some embodiments, the activity page includes a third control, and the processor, when executing the program code, is caused to perform:

displaying a resource record page in response to a trigger operation on the third control, wherein the resource record page includes media resources that have been displayed for a user account logged in with a terminal.

In some embodiments, the processor, when executing the program code, is caused to perform:

displaying a fourth control in the resource record page, wherein the fourth control is configured to trigger an operation of sharing the media resources that have been displayed for the user account.

In some embodiments, the processor, when executing the program code, is caused to perform:

displaying a first special effect in the activity page in response to the first region being a target region set by the user account logged in with the terminal; or displaying a second special effect in the activity page in response to the first region being a target region set by a server.

In some embodiments, the processor, when executing the program code, is caused to perform:

displaying resource prompt information in the activity page in response to an operation of viewing the first media resource, wherein the resource prompt information is configured to prompt resources acquired by the user account.

In some embodiments, the processor, when executing the program code, is caused to perform:

displaying the activity page in response to a target region having been set by a user account.

In some embodiments, the processor, when executing the program code, is caused to perform:

displaying a region filling page in response to no target region having been set by the user account, wherein the region filling page is configured to set the target region by the user account.

In some embodiments, the target event includes one of the follows: an operation of shaking the terminal, an operation of clicking a target region in the activity page, a trigger operation on controls in the activity page and an operation of receiving an audio instruction carrying a keyword.

In some embodiments, the processor, when executing the program code, is caused to perform:

displaying a resource card in the activity page, wherein the first media resource is displayed in the resource card.

Figure 24:
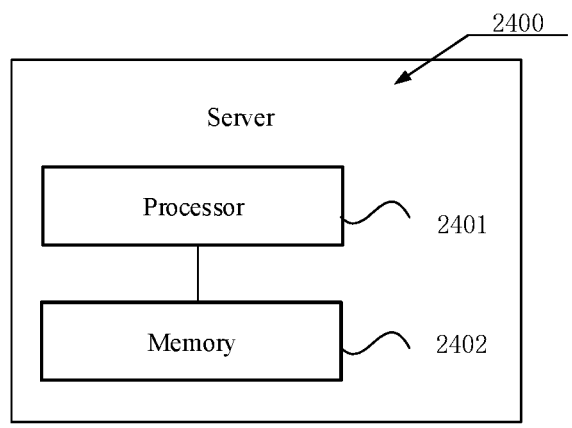
FIG. 24 is a structural block diagram of a server according to an exemplary embodiment.

FIG. 24 is a structural block diagram of a server according to an exemplary embodiment. Significant differences may be generated when the server 2400 has different configurations or performances. The server 2400 may include one or more processors (CPU) 2401 and one or more memories 2402 stored with at least one piece of program code, and the at least one piece of program code, when loaded and executed by the one or more processors 2401, cause the one or more processors 2401 to implement the method for displaying media resources according to the foregoing method embodiments. Of course, the server 2400 may further include components such as a wired or wireless network interface, a keyboard, and an input/output interface for input and output, and the server 2400 may further include other components for implementing device functions, which is not repeated here.

Embodiments of the present disclosure further provide a server, including: one or more processors; and a memory configured to store program code executable by the processor, wherein the processor, when executing the program code, is caused to perform: receiving a request for media resource acquisition transmitted by a terminal based on a activity page, wherein the activity page is configured to trigger a display of a media resource corresponding to a region; selecting a first media resource corresponding to a first region from multiple media resources; and returning resource information of the first media resource and the first region to the terminal.

In some embodiments, the processor, when executing the program code, is caused to perform: acquiring a state identification of a user account logged in with the terminal, wherein the state identification is configured to indicate that the user account has a permission for acquiring media resources; and selecting the first media resource in response to the state identification being valid.

In some embodiments, the processor, when executing the program code, is caused to perform: transmitting state prompt information to the terminal in response to the state identification being invalid, wherein the state prompt information is configured to prompt that the user account does not have the permission for acquiring the media resources.

In an exemplary embodiment, there is also provided a program code storage medium, such as a memory 2402 including a program code. The program code, when executed by the processor 2401 of the server 2400, causes the server 2400 to perform the method for displaying media resources. Optionally, the storage medium may be a non-transitory computer-readable storage medium, for example, the non-transitory computer-readable storage medium may be a read-only memory (ROM), a random-access memory (RAM), a compact-disc read-only memory (CD-ROM), a magnetic tape, a floppy disk and an optical data storage device, etc.

Embodiments of the present disclosure further provide a storage medium storing program code, wherein the program code, when executed by a processor of a terminal, causes the terminal to perform: displaying an activity page, wherein the activity page is configured to trigger a display of a media resource corresponding to a region; acquiring a first media resource corresponding to a first region in response to detecting a target event based on the activity page, wherein the first media resource is configured to recommend the first region; and displaying the first media resource in the activity page.

In some embodiments, the program code in the storage medium, when executed by the processor of the terminal, causes the terminal to perform: acquiring a second media resource corresponding to a second region in response to detecting the target event again based on the activity page, wherein the second region is different from the first region; and displaying the second media resource in the activity page.

In some embodiments, the program code in the storage medium, when executed by the processor of the terminal, causes the terminal to perform: acquiring a second media resource corresponding to a second region in response to detecting the target event based on the first page, wherein the first page is a page associated with the activity page; and displaying the second media resource in the activity page.

In some embodiments, the activity page includes a first control, and the program code in the storage medium, when executed by the processor of the terminal, causes the terminal to perform: displaying multiple other media resources corresponding to the first region in a second page in response to a trigger operation on the first control.

In some embodiments, a location tag of the first media resource belongs to the first region, and the program code in the storage medium, when executed by the processor of the terminal, causes the terminal to perform: displaying, in the second page, the multiple other media resources with location tags belonging to the first region.

In some embodiments, the activity page includes a second control, and the program code in the storage medium, when executed by the processor of the terminal, causes the terminal to perform: sharing the first media resource to a target object in response to a trigger operation on the second control.

In some embodiments, the program code in the storage medium, when executed by the processor of the terminal, causes the terminal to perform: displaying an activity entry in a first page, wherein the first page is a page associated with the activity page; and displaying the activity page in response to a trigger operation on the activity entry.

In some embodiments, the program code in the storage medium, when executed by the processor of the terminal, causes the terminal to perform: displaying the activity entry in the first page in a form of a pop-up window in response to displaying the first page for the first time for a terminal with a user account logged in; or displaying the activity entry in the first page in the form of a widget in response to displaying the first page not for the first time for the terminal with the user account logged in.

In some embodiments, the activity page includes a third control, and the program code in the storage medium, when executed by the processor of the terminal, causes the terminal to perform: displaying a resource record page in response to a trigger operation on the third control, wherein the resource record page includes media resources that have been displayed for a user account logged in with a terminal.

In some embodiments, the program code in the storage medium, when executed by the processor of the terminal, causes the terminal to perform: displaying a fourth control in the resource record page, wherein the fourth control is configured to trigger an operation of sharing the media resources that have been displayed for the user account.

In some embodiments, the program code in the storage medium, when executed by the processor of the terminal, causes the terminal to perform: displaying a first special effect in the activity page in response to the first region being a target region set by the user account logged in with the terminal; or displaying a second special effect in the activity page in response to the first region being a target region set by a server.

In some embodiments, the program code in the storage medium, when executed by the processor of the terminal, causes the terminal to perform: displaying resource prompt information in the activity page in response to an operation of viewing the first media resource, wherein the resource prompt information is configured to prompt resources acquired by the user account.

In some embodiments, the program code in the storage medium, when executed by the processor of the terminal, causes the terminal to perform: displaying the activity page in response to a target region having been set by a user account.

In some embodiments, the program code in the storage medium, when executed by the processor of the terminal, causes the terminal to perform: displaying a region filling page in response to no target region having been set by the user account, wherein the region filling page is configured to set the target region by the user account.

In some embodiments, the target event includes one of the follows: an operation of shaking the terminal, an operation of clicking a target region in the activity page, a trigger operation on controls in the activity page and an operation of receiving an audio instruction carrying a keyword.

In some embodiments, the program code in the storage medium, when executed by the processor of the terminal, causes the terminal to perform: displaying a resource card in the activity page, wherein the first media resource is displayed in the resource card.

Embodiments of the present disclosure further provide a storage medium storing program code, wherein the program code, when executed by a processor of a server, causes the server to perform: receiving a request for media resource acquisition transmitted by a terminal based on a activity page, wherein the activity page is configured to trigger a display of a media resource corresponding to a region; selecting a first media resource corresponding to a first region from multiple media resources; and returning resource information of the first media resource and the first region to the terminal.

In some embodiments, the program code in the storage medium, when executed by the processor of the server, causes the server to perform: acquiring a state identification of a user account logged in with the terminal, wherein the state identification is configured to indicate that the user account has a permission for acquiring media resources; and selecting the first media resource in response to the state identification being valid.

In some embodiments, the program code in the storage medium, when executed by the processor of the server, causes the server to perform: transmitting state prompt information to the terminal in response to the state identification being invalid, wherein the state prompt information is configured to prompt that the user account does not have the permission for acquiring the media resources.

Embodiments of the present disclosure further provide a computer program product including a computer program, wherein the computer program, when run by a processor, causes the processor to perform: displaying an activity page, wherein the activity page is configured to trigger a display of a media resource corresponding to a region; acquiring a first media resource corresponding to a first region in response to detecting a target event based on the activity page, wherein the first media resource is configured to recommend the first region; and displaying the first media resource in the activity page.

In some embodiments, the computer program, when run by the processor, causes the processor to perform: acquiring a second media resource corresponding to a second region in response to detecting the target event again based on the activity page, wherein the second region is different from the first region; and displaying the second media resource in the activity page.

In some embodiments, the computer program, when run by the processor, causes the processor to perform: acquiring a second media resource corresponding to a second region in response to detecting the target event based on the first page, wherein the first page is a page associated with the activity page; and displaying the second media resource in the activity page.

In some embodiments, the activity page includes a first control, and the computer program, when run by the processor, causes the processor to perform: displaying multiple other media resources corresponding to the first region in a second page in response to a trigger operation on the first control.

In some embodiments, a location tag of the first media resource belongs to the first region, and the computer program, when run by the processor, causes the processor to perform: displaying, in the second page, the multiple other media resources with location tags belonging to the first region.

In some embodiments, the activity page includes a second control, and the computer program, when run by the processor, causes the processor to perform: sharing the first media resource to a target object in response to a trigger operation on the second control.

In some embodiments, the computer program, when run by the processor, causes the processor to perform: displaying an activity entry in a first page, wherein the first page is a page associated with the activity page; and displaying the activity page in response to a trigger operation on the activity entry.

In some embodiments, the computer program, when run by the processor, causes the processor to perform: displaying the activity entry in the first page in a form of a pop-up window in response to displaying the first page for the first time for a terminal with a user account logged in; or displaying the activity entry in the first page in the form of a widget in response to displaying the first page not for the first time for the terminal with the user account logged in.

In some embodiments, the activity page includes a third control, and the computer program, when run by the processor, causes the processor to perform: displaying a resource record page in response to a trigger operation on the third control, wherein the resource record page includes media resources that have been displayed for a user account logged in with a terminal.

In some embodiments, the computer program, when run by the processor, causes the processor to perform: displaying a fourth control in the resource record page, wherein the fourth control is configured to trigger an operation of sharing the media resources that have been displayed for the user account.

In some embodiments, the computer program, when run by the processor, causes the processor to perform: displaying a first special effect in the activity page in response to the first region being a target region set by the user account logged in with the terminal; or displaying a second special effect in the activity page in response to the first region being a target region set by a server.

In some embodiments, the computer program, when run by the processor, causes the processor to perform: displaying resource prompt information in the activity page in response to an operation of viewing the first media resource, wherein the resource prompt information is configured to prompt resources acquired by the user account.

In some embodiments, the computer program, when run by the processor, causes the processor to perform: displaying the activity page in response to a target region having been set by a user account.

In some embodiments, the computer program, when run by the processor, causes the processor to perform: displaying a region filling page in response to no target region having been set by the user account, wherein the region filling page is configured to set the target region by the user account.

In some embodiments, the target event includes one of the follows: an operation of shaking the terminal, an operation of clicking a target region in the activity page, a trigger operation on controls in the activity page and an operation of receiving an audio instruction carrying a keyword.

In some embodiments, the computer program, when run by the processor, causes the processor to perform: displaying a resource card in the activity page, wherein the first media resource is displayed in the resource card.

Embodiments of the present disclosure further provide a computer program product including a computer program, wherein a processor, when run the computer program product, is caused to perform: receiving a request for media resource acquisition transmitted by a terminal based on a activity page, wherein the activity page is configured to trigger a display of a media resource corresponding to a region; selecting a first media resource corresponding to a first region from multiple media resources; and returning resource information of the first media resource and the first region to the terminal.

In some embodiments, the computer program, when run by the processor, causes the processor to perform: acquiring a state identification of a user account logged in with the terminal, wherein the state identification is configured to indicate that the user account has a permission for acquiring media resources; and selecting the first media resource in response to the state identification being valid.

In some embodiments, the computer program, when run by the processor, causes the processor to perform: transmitting state prompt information to the terminal in response to the state identification being invalid, wherein the state prompt information is configured to prompt that the user account does not have the permission for acquiring the media resources.

All the embodiments of the present disclosure can be executed individually or in combination with other embodiments, and they are all regarded as the scope of protection required by the present disclosure.

What is claimed is:

1. A method for displaying media resources, implemented in a terminal, the method comprising:
    displaying an activity page, wherein the activity page is configured to trigger a display of a media resource corresponding to a geographic region;
    acquiring a first media resource corresponding to a first region in response to detecting a target event based on the activity page, wherein the target event is an operation of shaking the terminal, the first media resource is configured to recommend the first region, and the first media resource and the first region are randomly selected by a server by one of: randomly selecting a media resource from multiple media resources as the first media resource, and taking a region corresponding to the first media resource as the first region; or randomly selecting one region of multiple regions as the first region, and randomly selecting, from multiple media resources corresponding to the first region, a media resource as the first media resource, such that a media resource of different regions is capable of being selected by the operation of shaking the terminal;

displaying the first media resource in the activity page, wherein the activity page comprises a first control configured to trigger a display of media resources with location tags belonging to a same region as a location tag of the first media resource; and displaying, in a second page, multiple other media resources with location tags belonging to the first region in response to a trigger operation on the first control, wherein the second page is configured to display multiple media resources with location tags belonging to a same region.

2. The method according to claim 1, further comprising:
acquiring a second media resource corresponding to a second region in response to detecting the target event again based on the activity page, wherein the second region is different from the first region; and
displaying the second media resource in the activity page.

3. The method according to claim 1, further comprising:
acquiring a second media resource corresponding to a second region in response to detecting the target event based on a first page, wherein the first page is a page associated with the activity page; and
displaying the second media resource in the activity page.

4. The method according to claim 1, wherein the activity page comprises a second control, and the method further comprise:
sharing the first media resource to a target object in response to a trigger operation on the second control.

5. The method according to claim 1, wherein displaying the activity page comprises:
displaying an activity entry in a first page, wherein the first page is a page associated with the activity page; and
displaying the activity page in response to a trigger operation on the activity entry.

6. The method according to claim 5, wherein displaying the activity entry in the first page comprises:
displaying the activity entry in the first page in a form of a pop-up window in response to displaying the first page for a first time for the terminal with a user account logged in; and
displaying the activity entry in the first page in the form of a widget in response to displaying the first page not for the first time for the terminal with the user account logged in.

7. The method according to claim 1, wherein the activity page comprises a third control, and the method further comprise:
displaying a resource record page in response to a trigger operation on the third control, wherein the resource record page comprises media resources that have been displayed for a user account logged in with a terminal.

8. The method according to claim 7, wherein displaying the resource record page comprises:

displaying a fourth control in the resource record page, wherein the fourth control is configured to trigger an operation of sharing the media resources that have been displayed for the user account.

9. The method according to claim 1, further comprising:
displaying a first special effect in the activity page in response to the first region being a target region set by a user account logged in with the terminal; and
displaying a second special effect in the activity page in response to the first region being a target region set by the server.

10. The method according to claim 1, further comprising:
displaying resource prompt information in the activity page in response to an operation of viewing the first media resource, wherein the resource prompt information is configured to prompt resources acquired by a user account.

11. The method according to claim 9, wherein displaying the activity page comprises:
displaying the activity page in response to a target region having been set by a user account.

12. The method according to claim 11, further comprising:
displaying a region filling page in response to no target region having been set by the user account, wherein the region filling page is configured to set the target region by the user account.

13. The method according to claim 1, wherein displaying the first media resource in the activity page comprises:
displaying a resource card in the activity page, wherein the first media resource is displayed in the resource card.

14. A method for displaying media resources, implemented in a server, the method comprising:
receiving a request for media resource acquisition transmitted by a terminal based on an activity page, wherein the activity page is configured to trigger a display of a media resource corresponding to a region, the request for media resource acquisition is transmitted from the terminal in response to detecting a target event based on the activity page, and the target event is an operation of shaking the terminal;
selecting a first media resource and a first region randomly by one of: randomly selecting a media resource from multiple media resources as the first media resource, and taking a region corresponding to the first media resource as the first region; or randomly selecting one region of multiple regions as the first region, and randomly selecting, from multiple media resources corresponding to the first region, a media resource as the first media resource, such that a media resource of different regions is capable of being selected by the operation of shaking the terminal, wherein the first media resource is configured to recommend the first region; and
returning resource information of the first media resource and the first region to the terminal, to cause the terminal to display the first media resource in the activity page, wherein the activity page comprises a first control configured to trigger a display of media resources with location tags belonging to a same region as a location tag of the first media resource; and display, in a second page, multiple other media resources with location tags belonging to the first region simultaneously in response to a trigger operation on the first control, wherein the second page is configured to display multiple media resources with location tags belonging to a same region.

15. The method according to claim 14, wherein selecting the first media resource and the first region comprises:
   acquiring a state identification of a user account logged in with the terminal, wherein the state identification is configured to indicate that the user account has a permission for acquiring media resources; and
   selecting the first media resource and the first region in response to the state identification being valid.

16. The method according to claim 15, further comprising:
   transmitting state prompt information to the terminal in response to the state identification being invalid, wherein the state prompt information is configured to prompt that the user account does not have the permission for acquiring the media resources.

17. A terminal, comprising:
   one or more processors; and
   a memory configured to store program code executable by the processor;
   wherein the processor, in response to executing the program code, is caused to perform:
   displaying an activity page, wherein the activity page is configured to trigger a display of a media resource corresponding to a region;
   acquiring a first media resource corresponding to a first region in response to detecting a target event based on the activity page, wherein the target event is an operation of shaking the terminal, the first media resource is configured to recommend the first region, and the first media resource and the first region are randomly selected by a server by one of: randomly selecting a media resource from multiple media resources as the first media resource, and taking a region corresponding to the first media resource as the first region; or randomly selecting one region of multiple regions as the first region, and randomly selecting, from multiple media resources corresponding to the first region, a media resource as the first media resource, such that a media resource of different regions is capable of being selected by the operation of shaking the terminal; and
   displaying the first media resource in the activity page, wherein the activity page comprises a first control configured to trigger a display of media resources with location tags belonging to a same region as a location tag of the first media resource; and
   displaying, in a second page, multiple other media resources with location tags belonging to the first region in response to a trigger operation on the first control, wherein the second page is configured to display multiple media resources with location tags belonging to a same region.

18. The method according to claim 1, wherein the first media resource comprises a video.

19. The method according to claim 14, wherein the first media resource comprises a video.

* * * * *